United States Patent
Tsukagoshi

(10) Patent No.: US 10,735,771 B2
(45) Date of Patent: Aug. 4, 2020

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/412,221

(22) Filed: May 14, 2019

(65) Prior Publication Data

US 2019/0335206 A1 Oct. 31, 2019

Related U.S. Application Data

(63) Continuation of application No. 15/112,059, filed as application No. PCT/JP2015/054074 on Feb. 16, 2015.

(30) Foreign Application Priority Data

Feb. 21, 2014 (JP) .................................. 2014-032354

(51) Int. Cl.
*H04N 19/30* (2014.01)
*H04N 19/70* (2014.01)
(Continued)

(52) U.S. Cl.
CPC ............ *H04N 19/70* (2014.11); *H04N 19/186* (2014.11); *H04N 19/30* (2014.11); *H04N 19/513* (2014.11); *H04N 19/98* (2014.11)

(58) Field of Classification Search
CPC ...... H04N 19/70; H04N 19/186; H04N 19/30; H04N 19/513
(Continued)

(56) References Cited

U.S. PATENT DOCUMENTS

| 2007/0201560 A1 | 8/2007 | Segall et al. |
| 2009/0285283 A1 | 11/2009 | Gao et al. |

(Continued)

FOREIGN PATENT DOCUMENTS

| EP | 2 667 610 A2 | 11/2013 |
| JP | 2006-352509 | 12/2006 |

(Continued)

OTHER PUBLICATIONS

International Search Report dated Apr. 21, 2015, in PCT/JP2015/054074 filed Feb. 16, 2015.

(Continued)

*Primary Examiner* — Nguyen T Truong
(74) *Attorney, Agent, or Firm* — Oblon, McClelland, Maier & Neustadt, L.L.P.

(57) ABSTRACT

To favorably transmit both of HDR image data and LDR image data. First transmission image data and second transmission image data are divided into layers and encoded, the first transmission image data being obtained by applying photo-electric conversion to first input image data having a contrast ratio of from 0 to 100% to brightness of a white peak of a conventional LDR image, and the second transmission image data being obtained by applying photo-electric conversion to second input image data having a contrast ratio of from 0 to 100%*(N is a number larger than 1), the contrast ratio exceeding the brightness of the conventional white peak, and a video stream having encoded image data of pictures of the layers is generated. A container in a predetermined format including the video stream is transmitted.

14 Claims, 21 Drawing Sheets

(51) Int. Cl.
*H04N 19/98* (2014.01)
*H04N 19/186* (2014.01)
*H04N 19/513* (2014.01)

(58) Field of Classification Search
USPC .................................................. 375/240.25
See application file for complete search history.

(56) References Cited

U.S. PATENT DOCUMENTS

| 2009/0290045 | A1 | 11/2009 | Fukuda et al. |
| 2011/0194618 | A1 | 8/2011 | Gish et al. |
| 2013/0314495 | A1 | 11/2013 | Chen et al. |
| 2015/0010059 | A1 | 1/2015 | Hattori et al. |

FOREIGN PATENT DOCUMENTS

| JP | 2006-352509 | A | 12/2006 |
| JP | 2007-243942 | | 9/2007 |
| JP | 2007-243942 | A | 9/2007 |
| JP | 2012-520619 | | 9/2012 |
| JP | 2012-520619 | A | 9/2012 |
| WO | WO 2008/019524 | A1 | 2/2008 |
| WO | WO 2014/002901 | A1 | 1/2014 |
| WO | WO 2014/002914 | A1 | 1/2014 |

OTHER PUBLICATIONS

"Series H: Audiovisual and Multimedia Systems Infrastructure of audiovisual services—Coding of moving video, High efficiency video coding", International Telecommunication Union, ITU-T Telecommunication Standardization Sector of ITU, H.265, Recommendation ITU-T H.265, (Apr. 2013), 317 pages.

Extended European Search Report dated Sep. 8, 2017 in Patent Application No. 15752009.9.

Office Action dated Apr. 23, 2019, in Japanese Patent Application No. 2016-504081 (w/English-language translation), 3 pgs.

Office Action dated Jan. 22, 2019, in Japan Patent Application No. 2016-504081. (7 pgs.).

"High Efficiency Video Coding", Series H: Audiovisual and Multimedia Systems—Infrastructure of audiovisual services—Coding of moving video; ITU-T H.265—Telecommunication Standardization Sector of ITU, International Telecommunication Union; Recommendation ITU-T H.265; 3 pgs.

Heiko Schwarz, et al., "Overview of the Scalable Video Coding Extension of the H.264/AVC Standard", IEEE Transactions on Circuits and Systems for Video Technology, XP055378169, vol. 17, No. 9, pp. 1103-1120.

Japanese Office Action dated Nov. 13, 2018 in Patent Application No. 2016-504081, 7 pgs.

Combined Chinese Office Action and Search Report dated Nov. 14, 2018, in Patent Application No. 201580008592.4 (w/English-language translation), 19 pgs.

Office Action dated Aug. 20, 2018 in European Patent Application No. 15 752 009.9, 6 pgs.

Wu. Y. et al., "Study of Inter-layer Prediction in Bit-depth Scalability" Joint Video Team (JVT) of ISO/IEC MPEG & ITU-T VCEG (ISO/IEC JTC1/SC29/WG11 and ITU-T SG16 Q.6) JVT-X052, XP030007159, 2007, 13 pgs.

European Office Action dated May 8, 2019, in Patent Application No. 15 752 009.9, 8 pages.

Babonneau, G. et al., "Carriage of MPEG-4 SVC over MPEG-2 Systems", International Organisation for Standardization, XP030042846, Jan. 10, 2007, 15 pages.

FIG. 6 (a)

NAL unit header syntax

| Syntax | No. of Bits | Format |
|---|---|---|
| nal_unit_header() { | | |
| forbidden_zero_bit | 1 | bslbf |
| nal_unit_type | 6 | uimslbf |
| nuh_layer_id | 6 | uimslbf |
| nuh_temporal_id_plus1 | 3 | uimslbf |
| } | | |

FIG. 6 (b)

Semantics definition of nal_unit_header nuh_layer_id (6)
    0      NO layer OTHER THAN temporal_id IS PROVIDED
    1      INDICATING layer OTHER THAN temporal_id BELONGS TO base layer
    2      INDICATING layer OTHER THAN temporal_id BELONGS TO enhance layer nuh_temporal_id_plus1 (3)
    temporal ID VALUE   INDICATING 1 to 6

FIG. 11 (a)

Level_Adjusting_SEI Syntax

| Syntax | No. of Bits | Format |
|---|---|---|
| user_data_unregistered (size) { | | |
| uuid_iso_iec_11578 | 128 | uimslbf |
| for( i = 16; i < payloadSize; i++ ) | | |
| user_data_payload_byte | 8 | bslbf |
| } | | |

FIG. 11 (b)

| Syntax | No. of Bits | Format |
|---|---|---|
| Level_Adjusting_SEI ( ) { | | |
| userdata_id | 16 | uimslbf |
| Level_Adjusting_SEI_length | 8 | uimslbf |
| Level_Adjusting_information_data() | | |
| } | | |

FIG. 12

Syntax of Level_Adjusting_SEI

| Syntax | No. of Bits | Format |
|---|---|---|
| Level_Adjusting_information_data ( ) { | | |
|   peak_brightness_level | 8 | uimslbf |
|   Contrast_ratio | 8 | uimslbf |
|   reserved | 4 | 0xf |
|   coded_bit_extension_minus1 | 4 | uimslbf |
|   number_of_entries = 2 ** (8 + coded_bit_extension_minus1 + 1) | | |
|   for ( i = 0 i < number_of_entries; i++) { | | |
|     level_adjust[i] | 16 | tcimslbf |
| } | | |

FIG. 13

Semantics definition of Level_Adjusting_information peak_brightness_level [8bits]
  INDICATING LEVEL OF BRIGHTNESS OF CURRENT PEAK
  peak_brightness_level * 100   (cd/m**2)

Contrast_ratio [8bits]
  INDICATING BRIGHTNESS EXPRESSION OF BLACK LEVEL AND EXPRESSING BY RATIO TO peak_brightness_level
  peak_brightness_level * ( 1 / (black_level * 100) )
  1      1/100 OF peak_brightness_level
  4      1/400 OF peak_brightness_level
  16     1/1600 OF peak_brightness_level
  64     1/6400 OF peak_brightness_level
  128    1/12800 OF peak_brightness_level coded_bit_extension_minus1 [4]
  INDICATING EXPANSION OF bit WIDTH PER component OF PIXEL TO BE TRANSMITTED
  0    1 bit EXPANSION   (8bit + 1bit = 9bits)
  1    2 bit EXPANSION   (8bit + 2bit = 10bits)
  2    3 bit EXPANSION   (8bit + 3bit = 11bits)
  3    4 bit EXPANSION   (8bit + 4bit = 12bits)
  :

level_adjust[i]   [16bis]
  INPUT  INDICATING CORRECTION VALUE OF i BY VALUE WITH CODE

FIG. 14

Layer_hierarchy_descriptor

| Syntax | No. of Bits | Format |
|---|---|---|
| Layer_hierarchy_descriptor(){ | | |
| Layer_hierarchy_tag | 8 | uimslbf |
| Layer_hierarchy_length | 8 | uimslbf |
| Layer_id_for_full_decoding | 3 | bslbf |
| Layer_id_for_base_decoding | 3 | bslbf |
| NAL_layer_signaling | 1 | bslbf |
| reserved | 1 | 0x1 |
| } | | |

FIG. 15

Semantics definition of Layer_hierarchy_descriptor

Layer_id_for_full_decoding (3)
INDICATING MAXIMUM temporal_id OF WHEN FULLY DECODING CORRESPONDING VIDEO STREAM Layer_id_for_partial_decoding (3)
INDICATING MAXIMUM temporal_id OF WHEN DECODING base layer PORTION OF CORRESPONDING VIDEO STREAM NAL_layer_signaling (1)
layer SIGNALING WITH nuh_layer_id IS PERFORMED FOR NAL unit header.

FIG. 19

|  | Base Layer | Enhanced Layer |
|---|---|---|
| METHOD A: | | |
| nuh_layer_id | 1, 1, 1 | 2, 2, 2 |
| nuh_temporal_id_plus1 | 0, 1, 2 | 3, 4, 5 |
| METHOD B: | | |
| nuh_layer_id | 0, 0, 0 | 0, 0, 0 |
| nuh_temporal_id_plus1 | 0, 1, 2 | 3, 4, 5 |

TRANSMISSION DEVICE, TRANSMISSION METHOD, RECEPTION DEVICE, AND RECEPTION METHOD

CROSS-REFERENCE TO RELATED APPLICATIONS

This application is a continuation application of and claims the benefit of priority under 35 U.S.C. § 120 from, U.S. application Ser. No. 15/112,059, filed Jul. 15, 2016, herein incorporated by reference, which is a National Stage Application of International Application No. PCT/JP2015/054074, filed Feb. 16, 2015, which claims the benefit of priority under 35 U.S.C. § 119 from Japanese Patent Application No. 2014-032354, filed Feb. 21, 2014.

TECHNICAL FIELD

The present technology relates to a transmission device, a transmission method, a reception device, and a reception method, and in details, relates to a transmission device and the like that treat high-dynamic-range video data.

BACKGROUND ART

Conventionally, gamma correction that corrects a gamma characteristic of a monitor by inputting image data having a reverse characteristic to a characteristic of the monitor is known. For example, Non-Patent Document 1 describes transmission of a video stream obtained by encoding transmission image data obtained by applying photo-electric conversion to high-dynamic-range (HDR) image data having a level range of 0 to 100% N (N is larger than 1).

Conventional low-dynamic-range (LDR) imaue is operated by mainly referring to brightness (a brightness level) of 100 cd/m**2, adjusting a contrast ratio to the brightness to become 100:1, and using minimum brightness as a black level, based on defined photo-electric/electric-photo conversion characteristics. A HDR image has fine levels at the black side, and is required to have the brightness level expand and be displayed. At the time of a camera output, special photo-electric conversion for HDR is sometimes used.

CITATION LIST

Non-Patent Document

Non-Patent Document 1: High Efficiency Video Coding (HEVC) ITU-T H.265 standard

SUMMARY OF THE INVENTION

Problems to be Solved by the Invention

An objective of the present technology is to enable favorable transmission of both of HDR image data and LDR image data.

Solutions to Problems

A concept of the present technology lies in a transmission device including:

an image encoding unit configured to divide first transmission image data and second transmission image data into layers and encode the layers, the first transmission image data being obtained by applying photo-electric conversion to first input image data having a contrast ratio of from 0 to 100% to brightness of a white peak of a conventional LDR image, and the second transmission image data being obtained by applying photo-electric conversion to second input image data having a contrast ratio of from 0 to 100%*N (N is a number larger than 1), the contrast ratio exceeding the brightness of the conventional white peak, to generate a video stream having encoded image data of pictures of the layers; and a transmission unit configured to transmit a container in a predetermined format including the video stream.

In the present technology, the first transmission image data and the second transmission image data are divided into layers and encoded by the image encoding unit, and the video stream having encoded image data of the layers is generated. The first transmission image data is obtained by applying photo-electric conversion to first input image data (LDR image data) having a contrast ratio of from 0 to 100% to brightness of a white peak of a conventional LDR image. The second transmission image data is obtained by applying photo-electric conversion to second input image data (HDR image data) having a contrast ratio of from 0 to 100%*N (N is a number larger than 1), the contrast ratio exceeding the brightness of the conventional white peak.

The container in a predetermined format including the video stream is transmitted by the transmission unit. For example, the container may be a transport stream (MPEG-2 TS) employed in a digital broadcast standard. Further, for example, the container may be a container in an MP4 format or other formats used in distribution of the Internet.

As described above, in the present technology, the first transmission image data obtained by applying photo-electric conversion to the LDR image data and the second transmission image data obtained by applying the photo-electric conversion to the HDR image data are divided into layers and encoded, and the container including the video stream having encoded image data of pictures of the layers is transmitted. Therefore, both of the HDR image data and the LDR image data can be favorably transmitted.

Note that, in the present technology, for example, the image encoding unit may perform subtraction processing between the second transmission image data and the first transmission image data to obtain difference image data, and may encode the first transmission image data to obtain first layer encoded image data, and encodes the difference image data to obtain second layer encoded image data. The difference image data is encoded and the second layer encoded image data is obtained, and the encoding efficiency can be improved.

In this case, for example, the image encoding unit may cause an encoded picture type of each of the pictures of the first transmission image data and an encoded picture type of each of the corresponding pictures of the difference image data to accord with each other. The picture types are caused to accord with each other in this way, decoding of each of the pictures of the first layer encoded image data and the decoding of each of the corresponding pictures of the second layer encoded image data can be performed at the same timing at the reception side. A decode delay up to obtaining the second transmission image data can be suppressed.

Further, in the present technology, for example, a layer information insertion unit configured to insert layer information of the encoded image data of pictures of the layers to a layer of the video stream or a layer of the container may be included. In this case, for example, the layer information insertion unit may insert the layer information into a header of a NAL unit when inserting the layer information into the layer of the video stream. Further, in this case, for example, the layer information to be inserted into the layer of the container may indicate a temporal ID corresponding to each of the layers. The layer information is inserted in this way, so that the encoded image data of the picture of each of the layers can be easily taken out from the video stream at the reception side.

Further, in the present technology, for example, the image encoding unit may apply level adjustment to the first transmission image data or the second transmission image data when performing the subtraction processing to obtain the difference image data. The level adjustment is performed in this way, the value of the difference image data can be made small, and the encoding efficiency can be further enhanced. In this case, for example, an information insertion unit that inserts characteristic information of the level adjustment and/or level information and contrast information of brightness to a layer of the video stream may be further included. Accordingly, at the reception side, the level of the first transmission image data is adjusted based on the characteristic information of the level adjustment and is added to the difference image data, so that the second transmission image data can be favorably obtained. Further, at the reception side, display adjustment can be performed using the level information and the contrast information of brightness.

Further, the concept of the present technology lies in a reception device including:

a reception unit configured to receive a container including a video stream having encoded image data of pictures of layers, the video stream being made by dividing first transmission image data and second transmission image data into layers and encoding the layers, the first transmission image data being obtained by applying photo-electric conversion to first input image data having a contrast ratio of from 0 to 100% to brightness of a white peak of a conventional LDR image, and the second transmission image data being obtained by applying photo-electric conversion to second input image data having a contrast ratio of from 0 to 100%*N (N is a number larger than 1), the contrast ratio exceeding the brightness of the conventional white peak; and a processing unit configured to process the video stream included in the container received in the reception unit.

In the present technology, the container including a video stream having encoded image data of pictures of layers, the video stream being made by dividing first transmission image data and second transmission image data into layers, and encoding the layers, is received by the reception unit. The first transmission image data is obtained by applying photo-electric conversion to first input image data (LDR image data) having a contrast ratio of from 0 to 100% to brightness of a white peak of a conventional LDR image. The second transmission image data is obtained by applying photo-electric conversion to second input imaue data (HDR image data) having a contrast ratio of from 0 to 100%*N (N is a number larger than 1), the contrast ratio exceeding the brightness of the conventional white peak.

The video stream included in the container received in the reception unit is processed in the processing unit. For example, the processing unit may selectively output the first transmission image data or the second transmission image data. In this case, for example, the processing unit may output the first transmission image data or the second transmission image data according to display capability of a display unit. Then, for example, an electric-photo converter that applies corresponding electric-photo conversion corresponding to the first transmission image data or the second transmission image data output from the processing unit may further be included.

As described above, in the present technology, the video stream having the encoded image data of pictures of layers, the video stream being made by dividing the first transmission image data obtained by applying the photo-electric conversion to the LDR image data and the second transmission image data obtained by applying the photo-electric conversion to the HDR image data into layers and encoding the layers. Therefore, both of the HDR image data and the LDR image data can be favorably received.

Note that, in the present technology, for example, the video stream may include first layer encoded image data made by encoding the first transmission image data, and second layer encoded image data made by encoding difference image data obtained by performing subtraction processing between the second transmission image data and the first transmission image data, and the processing unit may decode the first layer encoded image data to obtain the first transmission video data, and may add the first transmission image data to the difference image data obtained by decoding the second layer encoded image data to obtain the second transmission image data.

In this case, for example, layer information of the encoded image data of pictures of layers may be inserted into a layer of the video stream or a layer of the container, and the processing unit may take out the first layer encoded image data and the second layer encoded image data from the video stream based on the layer information. In this case, the encoded image data of the picture of each of the layers can be easily taken out from the video stream.

Further, in the present technology, for example, the processing unit may apply level adjustment to the first transmission image data or added image data when obtaining the second transmission image data. In this case, for example, characteristic information of the level adjustment is inserted in a layer of the video stream, and the processing unit may apply the level adjustment to the first transmission image data or the added image data based on the characteristic information of the level adjustment. By application of the level adjustment, the second transmission image data can be favorably obtained.

EFFECTS OF THE INVENTION

According to the present technology, both of HDR image data and LDR image data can be favorably transmitted. Note that the effects described in the present specification are merely exemplarily described and are not limited, and there may be additional effects.

BRIEF DESCRIPTION OF DRAWINGS

FIGS. 6(a) and 6(b) are diagrams illustrating a structure example of a NAL unit header and principal content in the structure example.

FIGS. 11(a) and 11(b) are diagrams illustrating a structure example of "Level_Adjusting SEI message".

FIG. 12 is a diagram illustrating a structure example of "Level_Adjusting_information_data( )".

FIG. 13 is a diagram illustrating principal content in the structure example of "Level_Adjusting_information_data( )".

FIG. 14 is a diagram illustrating a structure example of a layer hierarchy descriptor.

FIG. 15 is a diagram illustrating principal content in a structure example of a layer hierarchy descriptor.

FIG. 19 is a diagram for describing a method for classifying encoded image data CV1 in a first layer and encoded image data CV2 in a second layer included in a video stream.

MODE FOR CARRYING OUT THE INVENTION

Hereinafter, a form for implementing the invention (hereinafter, referred to as "embodiment") will be described. Note that description is given in the order below.

1. Embodiment
2. Modification

1. Embodiment

[Configuration of Transmission/Reception System]

Figure 1:
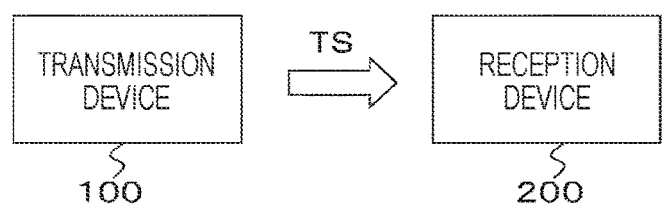
FIG. 1 is a block diagram illustrating a configuration example of a transmission/reception system.

FIG. 1 illustrating a configuration example of a transmission/reception system 10 as an embodiment. This transmission/reception system 10 is configured from a transmission device 100 and a reception device 200.

The transmission device 100 generates a transport stream TS of MPEG2 as a container, and transmits the transport stream TS through a broadcast wave or a packet of a network. This transport stream TS includes a video stream having encoded image data of pictures of layers, the transport stream TS being made by dividing first transmission image data and second transmission image data into layers and encoding the layers.

The transmission device 100 applies a photo-electric conversion characteristic (LDR OETF curve) for LDR image to first input image data (LDR image data) having a contrast ratio of from 0 to 100% to brightness of a white peak of a conventional LDR image to obtain the first transmission image data. Further, the transmission device 100 applies a photo-electric conversion characteristic (HDR OETF curve) for HDR image to second input image data (HDR image data) having a contrast ratio of from 0 to 100%*N (N is a number larger than 1), the contrast ratio exceeding the brightness of the conventional white peak, to obtain the second transmission image data.

As for the first transmission image data, the transmission device 100 encodes the first transmission image data as it is to obtain first layer encoded image data. Meanwhile, as for the second transmission image data, the transmission device 100 encodes difference image data obtained by subtracting the first transmission image data from the second transmission image data to obtain second layer encoded image data. As described above, encoding the difference image data between the first transmission image data and the second transmission image data, instead of encoding the second transmission image data itself, can enhance encoding efficiency.

When obtaining the difference image data, the transmission device 100 applies level adjustment to the first transmission image data. By applying the level adjustment in this way, the transmission device 100 can cause a value of the first transmission image data to approach a value of the second transmission image data, and can further enhance the encoding efficiency.

The transmission device 100 inserts characteristic information of the level adjustment into a layer of the video stream. With the characteristic information of the level adjustment, at a reception side, the level of the first transmission image data to be added to the difference image data to obtain the second transmission image data can be similarly adjusted to adjustment of a transmission side, and the second transmission image data can be accurately obtained.

The transmission device 100 classifies pictures of the first transmission image data and the difference image data into a plurality of hierarchies, and encodes the pictures. In this case, for example, encoding such as H.264/AVC or H.265/HEVC is applied such that a referred picture belongs to an own hierarchy and/or to a hierarchy lower than the own hierarchy.

The transmission device 100 performs encoding such that an encoded picture type of each of the pictures of the first transmission image data and an encoded picture type of each of the corresponding pictures of the difference image data accords with each other. By performing encoding such that the picture type of the both image data accord with each other, decode delay for obtaining the second transmission image data at the reception side can be suppressed.

The transmission device 100 adds, for each picture, hierarchical identification information for identifying a belonging hierarchy, to the encoded image data of the picture of each of the hierarchies. In this embodiment, "nuh_temporal_id plus1", which means a hierarchy identifier (temporal_id), is arranged in a header portion of a NAL unit (nal_unit) of each of the pictures. By adding hierarchical identification information in this way, the hierarchical identification of each of the pictures becomes possible in the layer of the NAL unit at the reception side.

The transmission device 100 allocates, for example, the encoded image data of each of the pictures of the first transmission image data to a lower hierarchy, and allocates the encoded image data of each of the pictures of the difference image data to a higher hierarchy. The transmission device 100 then adds layer information for identifying a layer, to the encoded image data of the picture of each of the hierarchies. In the embodiment, a layer identifier (Layer_id) is arranged in the header portion of the NAL unit (nal_unit) of each of the pictures as the layer information.

The transmission device 100 inserts the layer information for identifying the layer of the encoded image data of the picture of each of the hierarchies into the layer of the container (transport stream). This layer information is described in a descriptor in a video elementary stream loop under a program map table, for example. This layer information indicates a value of the hierarchy identifier (temporal_id) included in each of the layers.

As described above, by adding or inserting the layer information of the encoded image data of the picture of each of the hierarchies to the layer of the video stream or a layer of the container, the encoded image data of the picture of each of the layers can be easily and accurately taken out from the video stream at the reception side.

The reception device 200 receives the transport stream TS sent from the transmission device 100 through a broadcast wave or a packet of a network. This transport stream TS includes the video stream having encoded images of pictures of layers, the transport stream TS being made by dividing the first transmission image data and the second transmission image data into layers and encoding the layers.

The reception device 200 processes the video stream, and selectively outputs the first transmission image data or the second transmission image data based on display capability of the display unit. That is, in a case where the display unit has display capability of the LDR image, the reception device 200 outputs the first transmission image data, applies electric-photo conversion corresponding to the LDR image to the transmission image data, and sends the transmission image data to the display unit. Meanwhile, in a case where the display unit has display capability of the HDR image, the reception device 200 outputs the second transmission image data, applies the electric-photo conversion corresponding to the HDR image to the transmission image data, and sends the transmission image data to the display unit.

As described above, the video stream has the first layer encoded image data made by encoding the first transmission image data, and the second layer encoded image data made by encoding the difference image data obtained by subtracting the first transmission image data from the second transmission image data. The reception device 200 decodes the first layer encoded image data to obtain the first transmission video data, and decodes the second layer encoded image data to obtain the difference image data, and adds the first transmission image data to the difference imaue data to obtain the second transmission image data.

As described above, the layer information of the encoded image data of the picture of each of the layers is inserted into the layer of the video stream or the layer of the container. The reception device 200 takes out the first layer encoded image data and the second layer encoded image data from the video stream based on the layer information.

Further, as described above, the characteristic information of the level adjustment is inserted into the layer of the video stream. The reception device 200 adjusts the level of the first transmission image data to be added to the difference image data to obtain the second transmission image data, similarly to the adjustment of the transmission side, with the characteristic information of the level adjustment.

(Configuration of Transmission Device)

Figure 2:
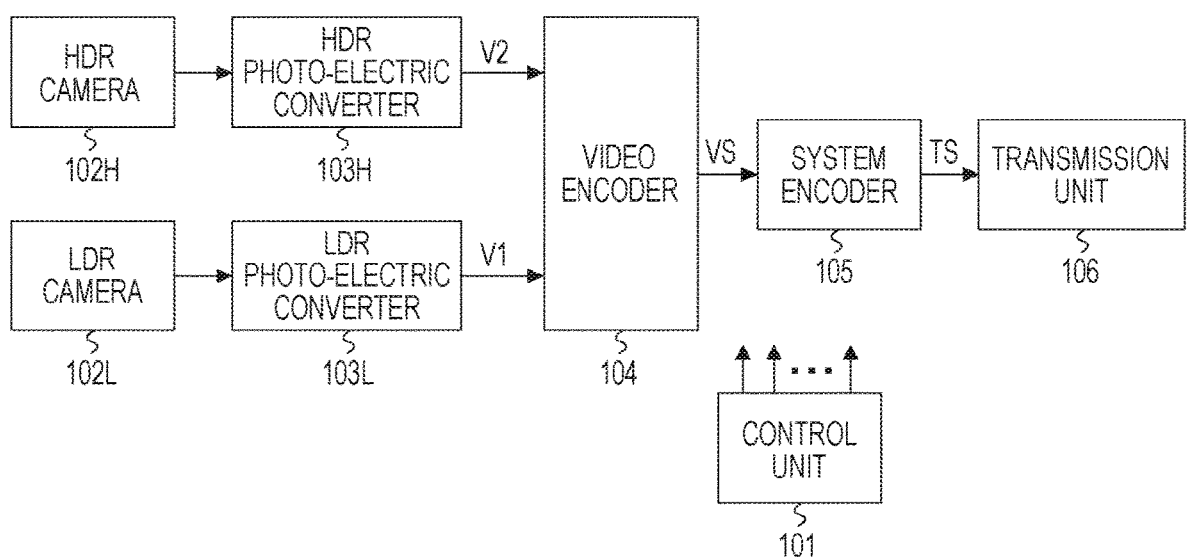
FIG. 2 is a block diagram illustrating a configuration example of a transmission device that configures the transmission/reception system.

FIG. 2 illustrates a configuration example of the transmission device 100. The transmission device 100 includes a control unit 101, an LDR camera 102L, an HDR camera 102H, an LDR photo-electric converter 103L, an HDR photo-electric converter 103H, a video encoder 104, a system encoder 105, and a transmission unit 106. The control unit 101 includes a central processing unit (CPU), and controls operations of the respective units of the transmission device 100 based on a control program stored in a storage (not illustrated).

The LDR camera 102L images an object, and outputs a low-dynamic-range (LDR) image data (LDR video data). This LDR image data has a contrast ratio of from 0 to 100% to brightness of a white peak of a conventional LDR image. The HDR camera 102H images the same object as the object of the LDR camera 102L, and outputs a high-dynamic-range (HDR) image data (HDR video data). This HDR image data has a contrast ratio of 0 to 100%*N, for example, 0 to 400% or 0 to 800%. Here, the level of 100% may be based on a level corresponding to a white luminance value of 100 cd/m**2.

Figure 3:
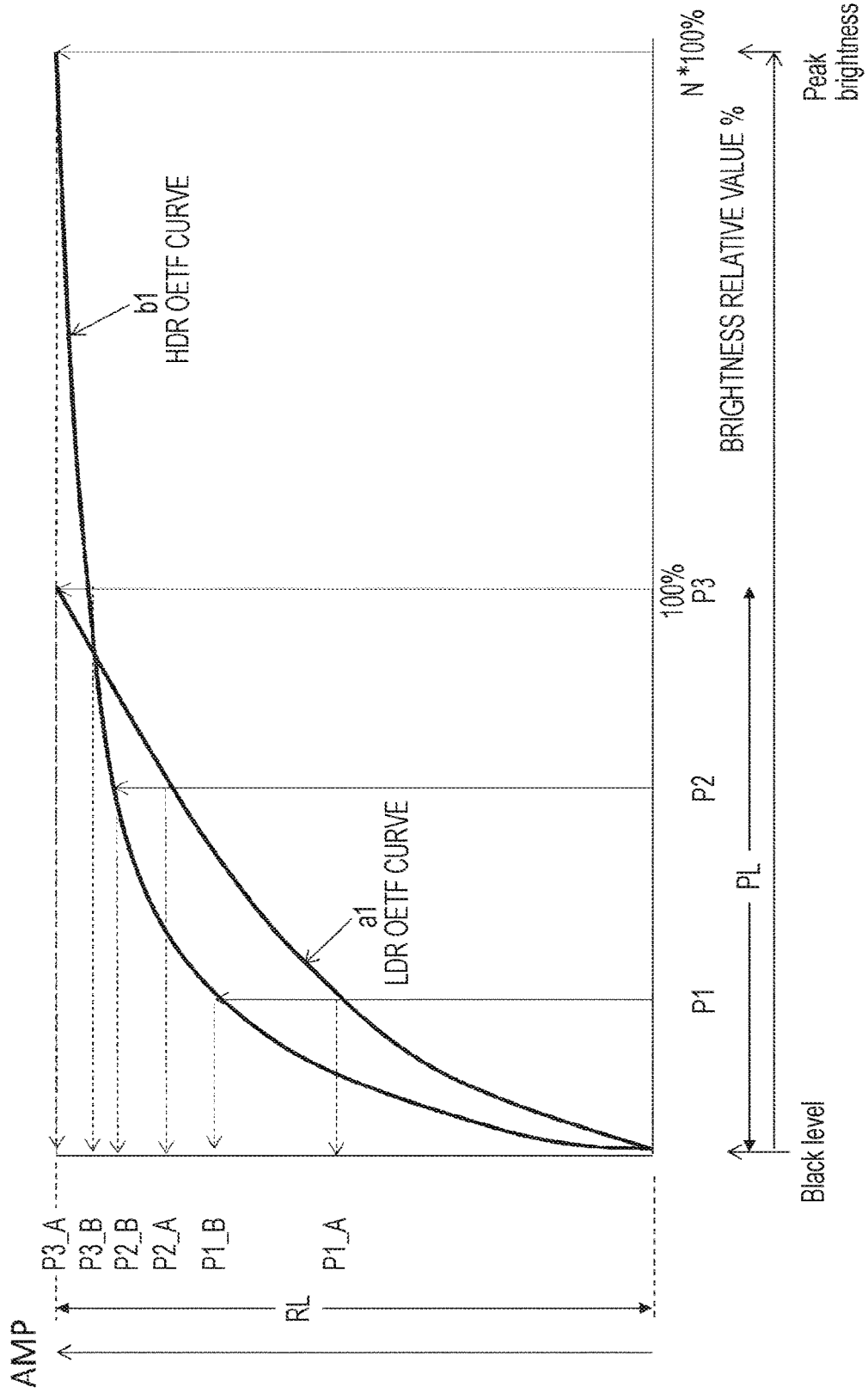
FIG. 3 is a diagram illustrating an example of a photo-electric conversion characteristic (an LDR OETF curve and an HDR OETF curve) for LDR image and HDR image.
Figure 4:
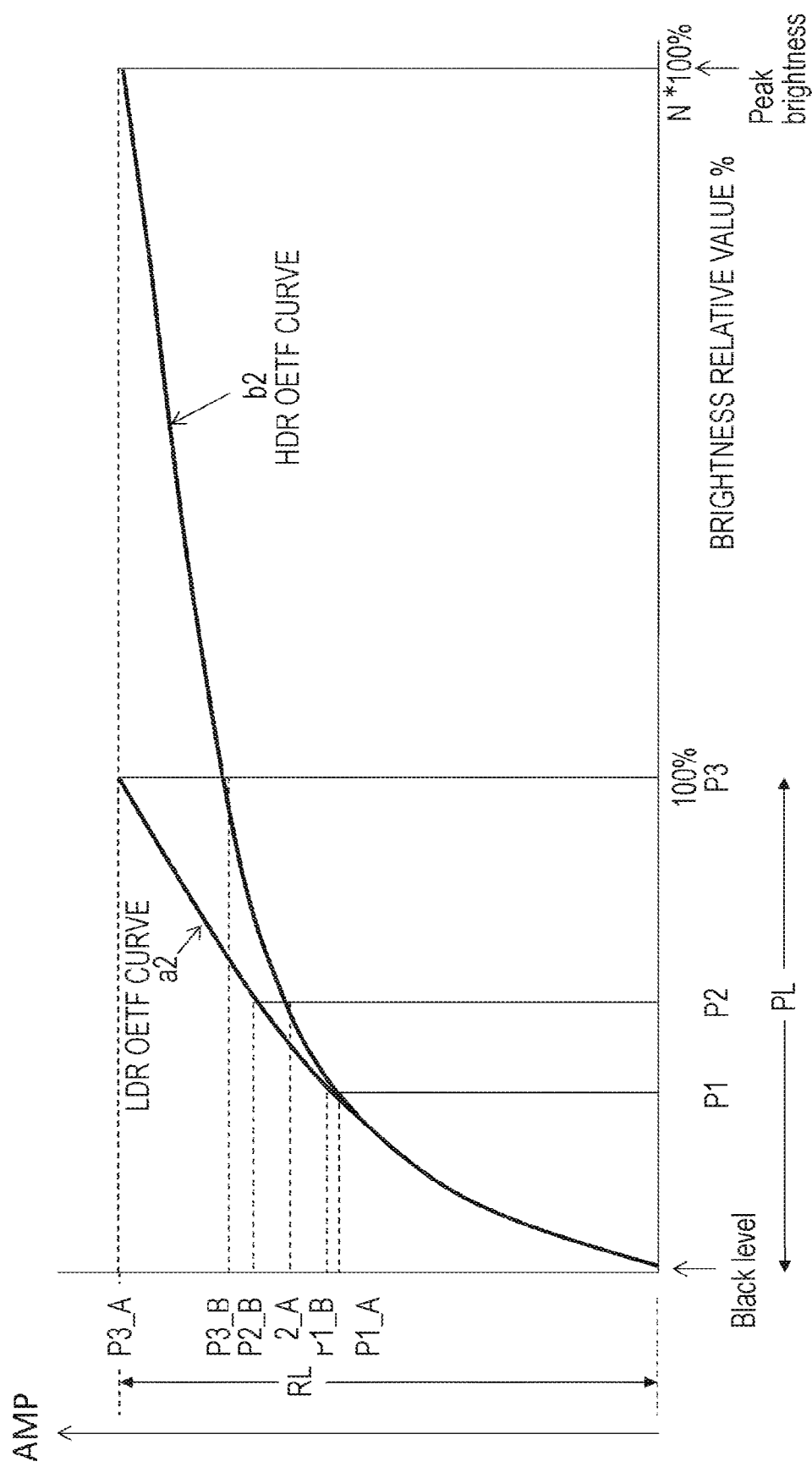
FIG. 4 is a diagram illustrating another example of a photo-electric conversion characteristic (an LDR OETF curve and an HDR OETF curve) for LDR, image and HDR image.

The LDR photo-electric converter 103L applies the photo-electric conversion characteristic (LDR OETF curve) for LDR image to the LDR image data obtained from the camera 102L to obtain first transmission image data V1. The curve a1 in FIG. 3 illustrates an example of the LDR OETF curve. Further, the curve a2 in FIG. 4 illustrates another example of the LDR OETF curve. The HDR photo-electric converter 103H applies the photo-electric conversion characteristic (HDR OETF curve) for HDR image to the HDR image data obtained from the camera 102H to obtain second transmission image data V2. The curve b1 in FIG. 3 illustrates an example of the HDR OETF curve. Further, the curve b2 in FIG. 4 illustrates another example of the HDR OETF curve.

Note that, in FIG. 3 or 4, the horizontal axis represents an input of the LDR photo-electric converter 103L or the HDR photo-electric converter 103H with a brightness relative value [%]. The black level accords with the minimum value of the contrast ratio of N*100:1. In display at the reception side, this value can be referred to. The peak brightness specifies peak brightness (the maximum illuminance value) of HDR, and a relative value N*100 is used. A receiver can perform necessary luminance adjustment between the value and the display capability of the display device (display unit) when performing the electric-photo conversion (EOTF). Alternatively, the receiver can realize a similar effect by sending a value of an intermediate level of the brightness and a value of a contrast ratio thereof to the reception side, instead of specifying the maximum brightness level. Further, in FIG. 3 or 4, the vertical axis represents an amplitude value (AMP) that is an output of the LDP, photo-electric converter 103L or the
HDR photo-electric converter 103H.

The video encoder 104 divides the first transmission image data V1 and the second transmission image data V2 into layers and encodes the layers to generate a video stream VS having encoded image data of pictures of the layers. In this case, the video encoder 104 encodes the first transmission image data V1 as it is to obtain the first layer encoded image data. Further, in this case, the video encoder 104 subtracts the first transmission image data VD1 from the second transmission image data V2 to obtain difference image data DV, and encodes the difference image data DV to obtain the second layer encoded image data.

To enhance the encoding efficiency, the video encoder 104 applies the level adjustment to the first transmission image data, and causes the value of the first transmission image data V1 to approach the value of the second transmission image data V2, when obtaining the difference image data DV. In this case, although detailed description is omitted, the adjustment is performed based on a level adjustment curve (level coordination curve) obtained from a relationship between the LDR OETF curve and the HDR OETF curve. At this time, the video encoder 104 inserts the characteristic information of the level adjustment, that is, level adjustment curve information into the layer of the video stream.

The video encode 104 classifies the pictures of the first transmission image data V1 and the difference image data DV into a plurality of hierarchies, and encodes the pictures. In this case, the encoded image data of each of the pictures of the first transmission image data V1 is allocated to a lower hierarchy, and the encoded image data of each of the pictures of the difference image data DV is allocated to a higher hierarchy. Then, in this case, the encoding is performed such that the encoded picture type of each of the pictures of the first transmission image data V1 and the encoded picture type of each of the corresponding pictures of the difference image data DV accord with each other.

The video encoder 104 adds, for each picture, the hierarchical identification information for identifying a belonging hierarchy to the encoded image data of the picture of each of the hierarchies. In this embodiment, "nuh_temporal_id_plus1"), which means a hierarchy identifier (temporal_id), is arranged in the header portion of the NAL unit (nal_unit) of each of the pictures. Further, the video encoder 104 adds, for each picture, the layer information for identifying an encoding layer to the encoded image data of the picture of each of the hierarchies. In this embodiment, the layer identifier (Layer_id)) is arranged in the header portion of the NAL unit (nal_unit) of each of the pictures as the layer information.

Figure 5:
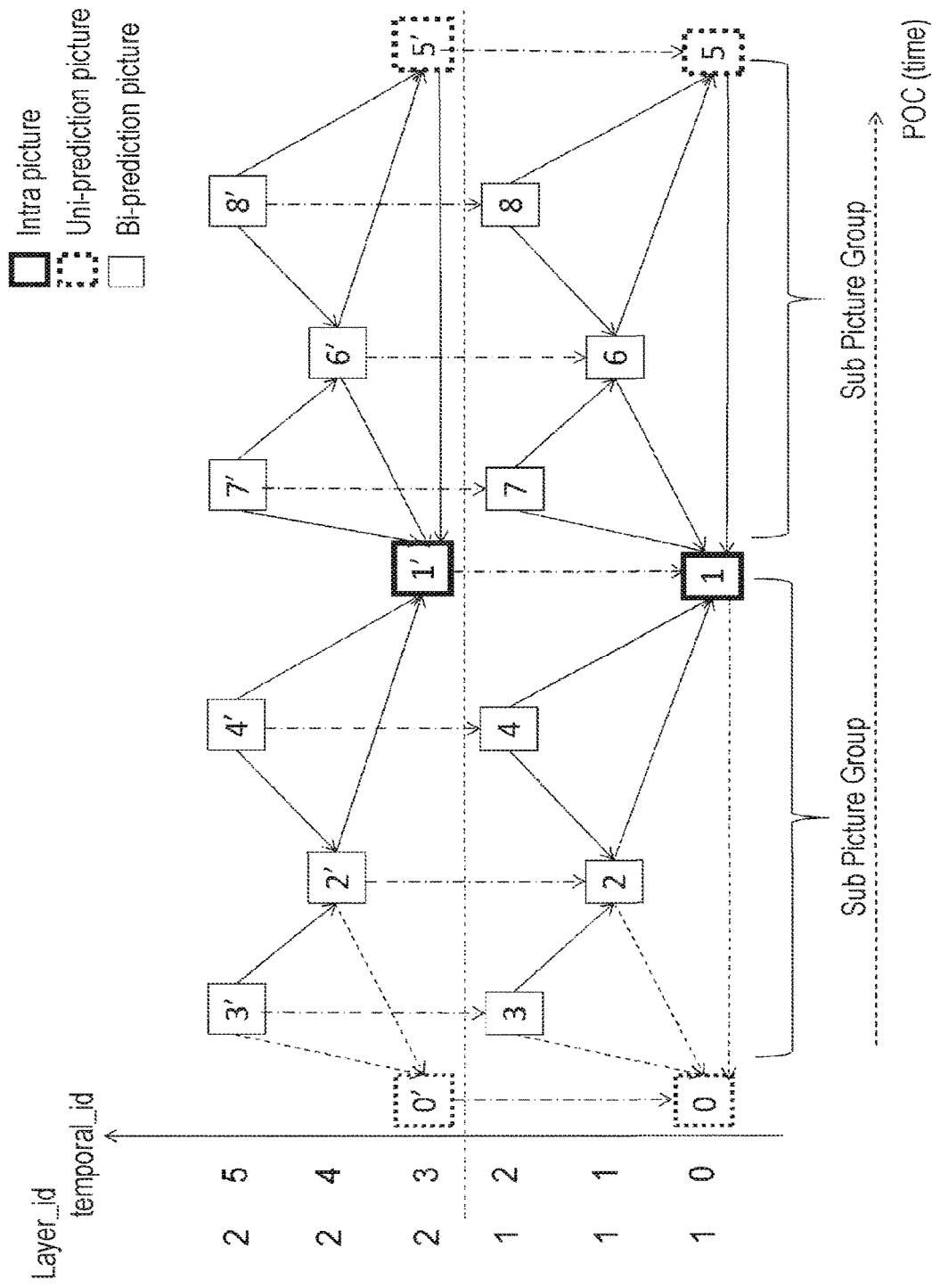
FIG. 5 is a diagram illustrating an example of hierarchical encoding performed in a video encoder of the transmission device.

FIG. 5 illustrates an example of hierarchical encoding performed in the video encoder 104. This example is an example in which the pictures are classified into six hierarchies of 0 to 5, and encoding is applied to the image data of the picture of each of the hierarchies. The vertical axis represents the hierarchy. The pictures of the first transmission image data V1 configure lower hierarchies of hierarchies 0 to 2, and the pictures of the difference image data DV configure higher hierarchies of hierarchies 3 to 5.

As temporal_ids (hierarchical identification information) to be allocated to the header portion of the NAL unit (nal_unit) that configures the encoded image data of the pictures of the hierarchies 0 to 5, 0 to 5 are respectively set. The horizontal axis represents a display order (POC: picture order of composition), and the left side indicates earlier in a display time and the right side indicates later in the display time.

FIG. 6(a) illustrates a structure example (syntax) of a NAL unit header, and FIG. 6(b) illustrates content (semantics) of principal parameters in the structure example. 0 is essential for a 1-bit field of "Forbidden_zero_bit", and a 6-field of "nal_unit_type" indicates the NAL unit type.

A 6-bit field of "nuh_layer_id" indicates the layer identifier (Layer_id). "0" indicates that no layer other than the temporal_id (hierarchical identification information) is provided. "1" indicates that the layer other than the temporal_id (hierarchical identification information) belongs to the base layer, that is, the first layer. "2" indicates that the layer other than the temporal_id (hierarchical identification information) belongs to the enhanced layer, that is, the second layer. A 3-bit field of "nuh_temporal_id_plus1" indicates the temporal_id, and indicates a value (1 to 6) to which 1 is added.

Referring back to FIG. 5, the rectangular frames illustrate pictures, and the numbers indicate the order of encoded pictures, that is, an encoding order (a decoding order at the reception side). Four pictures from "1" to "4" configure a sub picture group of the first transmission image data V1, and "1" is a head picture of the sub picture group. "0" is a picture of a preceding sub picture group. Further, four pictures from "5" to "8" configure a next sub picture group of the first transmission image data V1, and "5" is a head picture of the sub picture group. Here, "1" is an picture (Intra picture), "5" is a P picture (uni-prediction picture), and others are B pictures (Bi-prediction picture).

Further, four pictures from "1'" to "4'" configure a sub picture group of the difference image data DV, and "1'" is a head picture of the sub picture group. "0'" is a picture of a preceding sub picture group. Further, four pictures from "5'" to "8'" configure a next sub picture group of the difference image data DV, and "5'" is a head picture of the sub picture group. Here, "1'" is an I picture (Intra picture), "5'" is a P picture (Uni-prediction picture), and others are B pictures (Bi-prediction picture).

As illustrated, the pictures from "1" to "8" of the first transmission image data V1 correspond to the pictures from "1'" to "8'" of the differential image data DV, and encoding is performed such that the encoded picture types of the pictures of the first transmission image data V1 and the encoded picture types of the corresponding pictures of the difference image data DV accord with each other.

The solid-line arrows illustrate reference relationships among pictures in encoding. For example, the picture "5" is the P picture, and is encoded by reference to the picture "1". Further, the picture "6" is the B picture, and is encoded by reference to the pictures " " and "5". Similarly, other pictures are encoded by reference to neighbor pictures in a display order.

Figure 7:
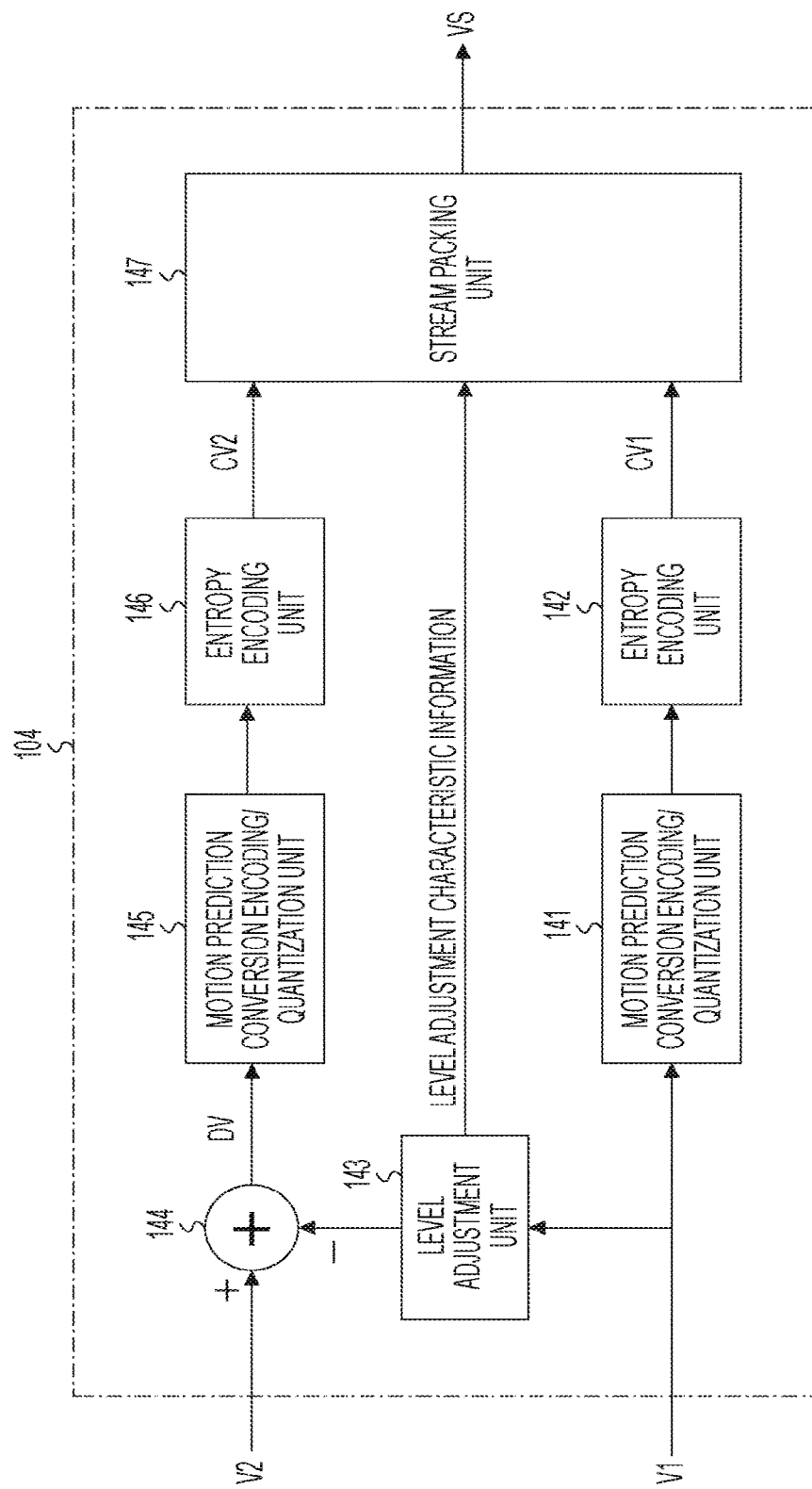
FIG. 7 is a block diagram illustrating a configuration example of a video encoder.

FIG. 7 illustrates a configuration example of the video encoder 104. The video encoder 104 includes a motion prediction conversion encoding/quantization unit 141, an entropy encoding unit 142, a level adjustment unit 143, a subtraction unit 144, a motion prediction conversion encoding/quantization unit 145, an entropy encoding unit 146, and a stream packing unit 147.

The motion prediction conversion encoding/quantization unit 141 performs motion prediction conversion encoding for the first transmission image data V1 from time axis data into frequency axis data, and further performs quantization for the frequency axis data to obtain quantized data. The entropy encoding unit 142 performs entropy encoding for the quantized data obtained in the motion prediction conversion encoding/quantization unit 141 to obtain first layer encoded image data CV1.

The level adjustment unit 143 applies level adjustment to the first transmission image data V1 to enhance the encoding efficiency, and causes the value of the first transmission image data V1 to approach the value of the second transmission image data V2. The level adjustment unit 143 adjusts the level of the first transmission imaue data based on the level adjustment curve (level coordination curve) obtained from the relationship between the LDR OETF curve and the HDR OETF curve.

The level adjustment will be further described. Description is given with reference to the LDR OETF curve and the HDR OETF curve in FIG. 3. In the level adjustment, correction is applied to an AMP value of LDR such that the AMP value (the value of the first transmission image data V1) of LDR approaches an AMP value (the value of the second transmission image data V2) of HDR within a PL range of an LDR brightness relative value (an input range of the horizontal axis). In this case, Px_A that is the AMP value (the value of the first transmission image data V1) of LDR to be corrected is mapped on Px_B.

Figure 8:
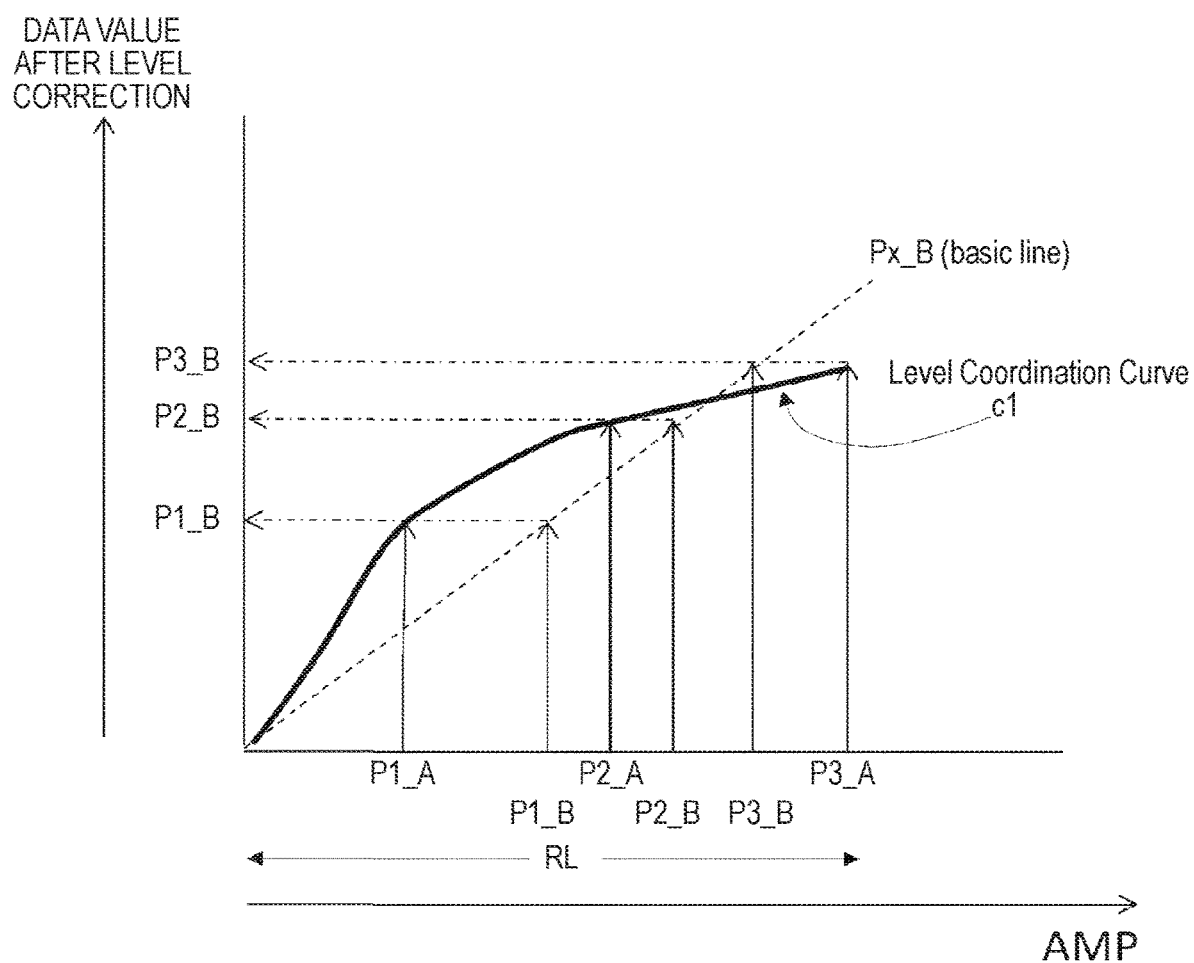
FIG. 8 is a diagram illustrating an example of a level adjustment curve (mapping curve) for causing a value of first transmission image data V1 to approach a value of second transmission image data V2.

The curve c1 in FIG. 8 illustrates a mapping curve of that time. This mapping curve configures a level adjustment curve in a case where the LDR OETF curve and the HDR OETF curve in FIG. 3 are used. The level adjustment unit 143 maps Px_A that is the AMP value (the value of the first transmission image data V1) of LDR on Px_B based on this mapping curve, and causes the value of the first transmission image data V1 to approach the value of the second transmission imaue data V2.

Figure 9:
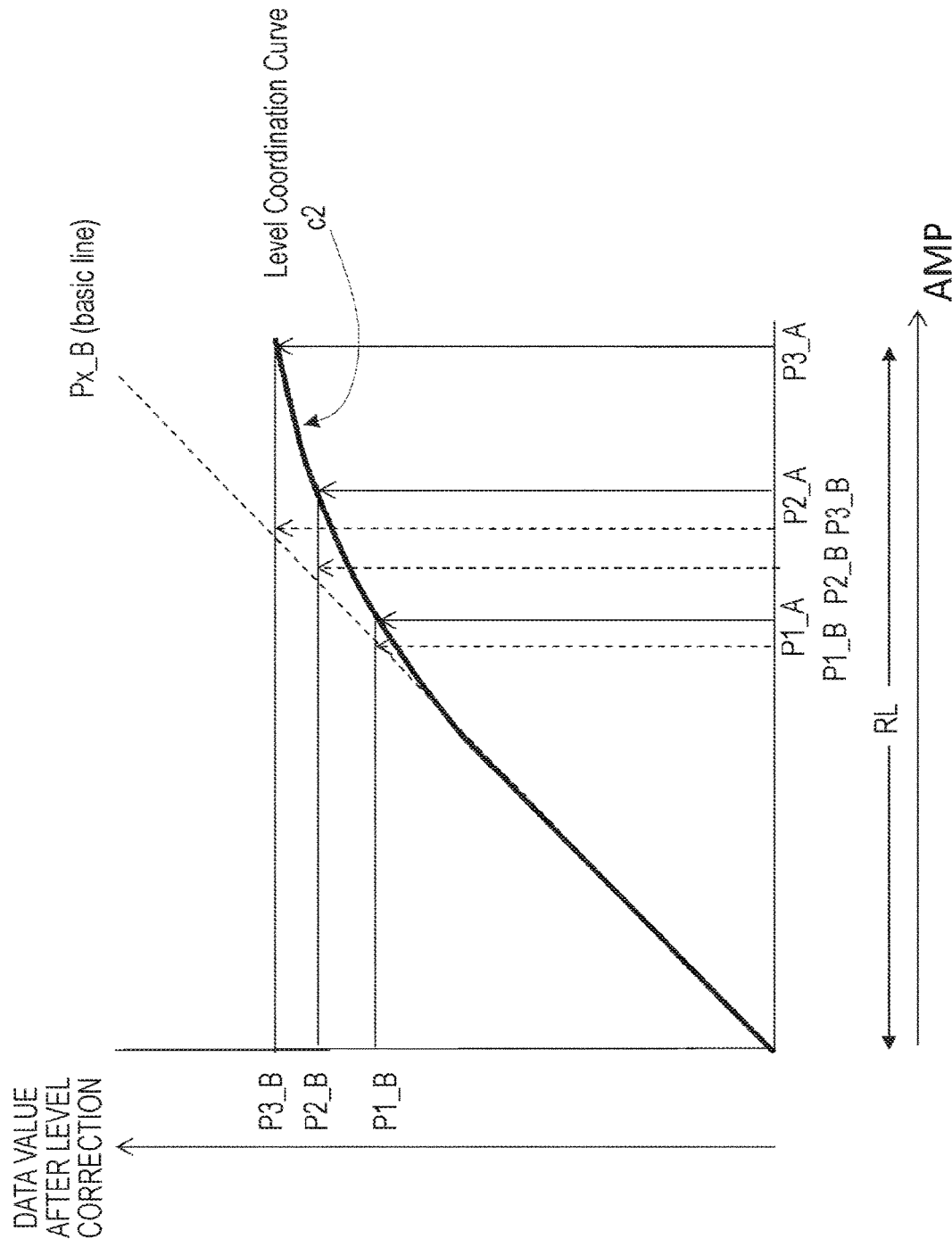
FIG. 9 is a diagram illustrating another example of a level adjustment curve (mapping curve) for causing a value of first transmission image data V1 to approach a value of second transmission image data V2.

Note that, even if the LDR OETF curve and the HDR OETF curve are in another combination, the mapping curve that configures the level adjustment curve can be similarly obtained, and the level adjustment unit 143 can cause the value of the first transmission image data V1 to approach the value of the second transmission image data V2 by mapping Px_A that is the AMP value (the value of the first transmission image data V1) of LDR on Px_B based on the mapping curve. For example, the curve c2 in FIG. 9 illustrates a mapping curve in a case where the LDR OETF curve and the HDR OETF curve in FIG. 4 are used.

Referring back to FIG. 7 the subtraction unit 144 subtracts the first transmission image data V1 subjected to the level adjustment in the level adjustment unit 143 from the second transmission image data V2 to obtain the difference image data DV. Note that, in this generation of the difference image data DV, prediction processing using a motion vector, similar to the motion prediction conversion encoding/quantization unit 145, is performed such that difference information becomes small, and the motion vector is transmitted together with difference data. The motion prediction conversion encoding/quantization unit 145 performs motion prediction conversion encoding for the difference image data DV from time axis data to frequency axis data, and further performs quantization for the frequency axis data to obtain quantized data. The entropy encoding unit 146 performs entropy encoding for the quantized data obtained in the motion prediction conversion encoding/quantization unit 145 to obtain second layer encoded image data CV2.

The stream packing unit 147 generates a video stream (video elementary stream) VS including the first layer encoded image data CV1 and the second layer encoded image data CV2. At this time, "nuh_temporal_id_plus1"), which means a hierarchy identifier (temporal_id), is arranged, and the layer identifier (Layer_id) is arranged, in the header portion of the NAL unit (nal_unit) of each of the pictures. Further, at this time, the characteristic information of the level adjustment is inserted into the layer of the video stream. This characteristic information is inserted in a group of pictures (GOP) unit that is a display access unit including a predicted image, for example.

Referring back to FIG. 2, the system encoder 105 generates the transport stream TS including the video stream VS generated in the video encoder 104. The transmission unit 106 then transmits the transport stream TS to the reception device 200 through a broadcast wave or a packet of a network.

At this time, the system encoder 105 inserts the layer information for identifying the layer of the encoded image data of the picture of each of the hierarchies into the layer of the container (transport stream). This layer information is described in the descriptor in the video elementary stream loop under the program map table, for example. This layer information indicates the value of the hierarchy identifier (temporal_id) included in each of the layers.

An operation of the transmission device 100 illustrated in FIG. 2 will be briefly described. LDR image data (LDR video data) imaged and obtained in the LDR camera 102L is supplied to the LDR photo-electric converter 103L. In this LDR photo-electric converter 103L, the photo-electric conversion characteristic (LDR OETF curve) for LDR image is applied to the LDR image data, and the first transmission image data V1 is obtained. This first transmission image data V1 is supplied to the video encoder 104.

Further, HDR image data (HDR video data) imaged and obtained in the HDR camera 102H is supplied to the HDR photo-electric converter 103H. In this HDR photo-electric converter 103H, the photo-electric conversion characteristic (LDR OETF curve) for HDR image is applied to the HDR image data, and the second transmission image data V2 is obtained. This second transmission image data V2 is supplied to the video encoder 104.

In the video encoder 104, the first transmission image data V1 and the second transmission image data V2 are divided into layers and the layers are encoded, and the video stream VS having encoded image of pictures of the layers is generated. In this case, the first transmission image data V1 is encoded as it is and the first layer encoded image data is obtained. Further, in this case, the difference image data DV obtained by subtracting the first transmission image data VD1 from the second transmission image data V2 is encoded and the second layer encoded image data is obtained.

Here, to enhance the encoding efficiency, the level adjustment is applied to the first transmission image data based on the level adjustment curve (mapping curve) obtained from the relationship between the LDR OETF curve and the HDR OETF curve, and the value of the first transmission image data V1 is caused to approach the value of the second transmission image data V2, when the difference image data DV is obtained.

Further, in the video encoder 104, the hierarchical identification information for identifying the belonging hierarchy is added to, for each picture, the encoded image data of the picture of each of the hierarchies. Further, in the video encoder 104, the layer information for identifying the layer is added to, for each picture, the encoded image data of the picture of each of the hierarchies.

The video stream VS generated in the video encoder 104 is supplied to the system encoder 105. In this system encoder 105, the transport stream TS of MPEG2 including the video stream is generated. At this time, in the system encoder 105, the layer information for identifying the layer of the encoded image data of the picture of each of the hierarchies is inserted into the layer of the container (transport stream). This transport stream TS is transmitted by the transmission unit 106 to the reception device 200 through a broadcast wave or a packet of a network.

[Level Adjustment Characteristic information, Layer Information, and TS Configuration]

As described above, the level adjustment characteristic information is inserted into the layer of the video stream. For example, in a case where the encoding method is HEVC, this level adjustment characteristic information is inserted into a portion of "SEIs" of an access unit (AU) as a level adjusting/SEI message (Level_Adjusting SEI messaue).

Figure 10:
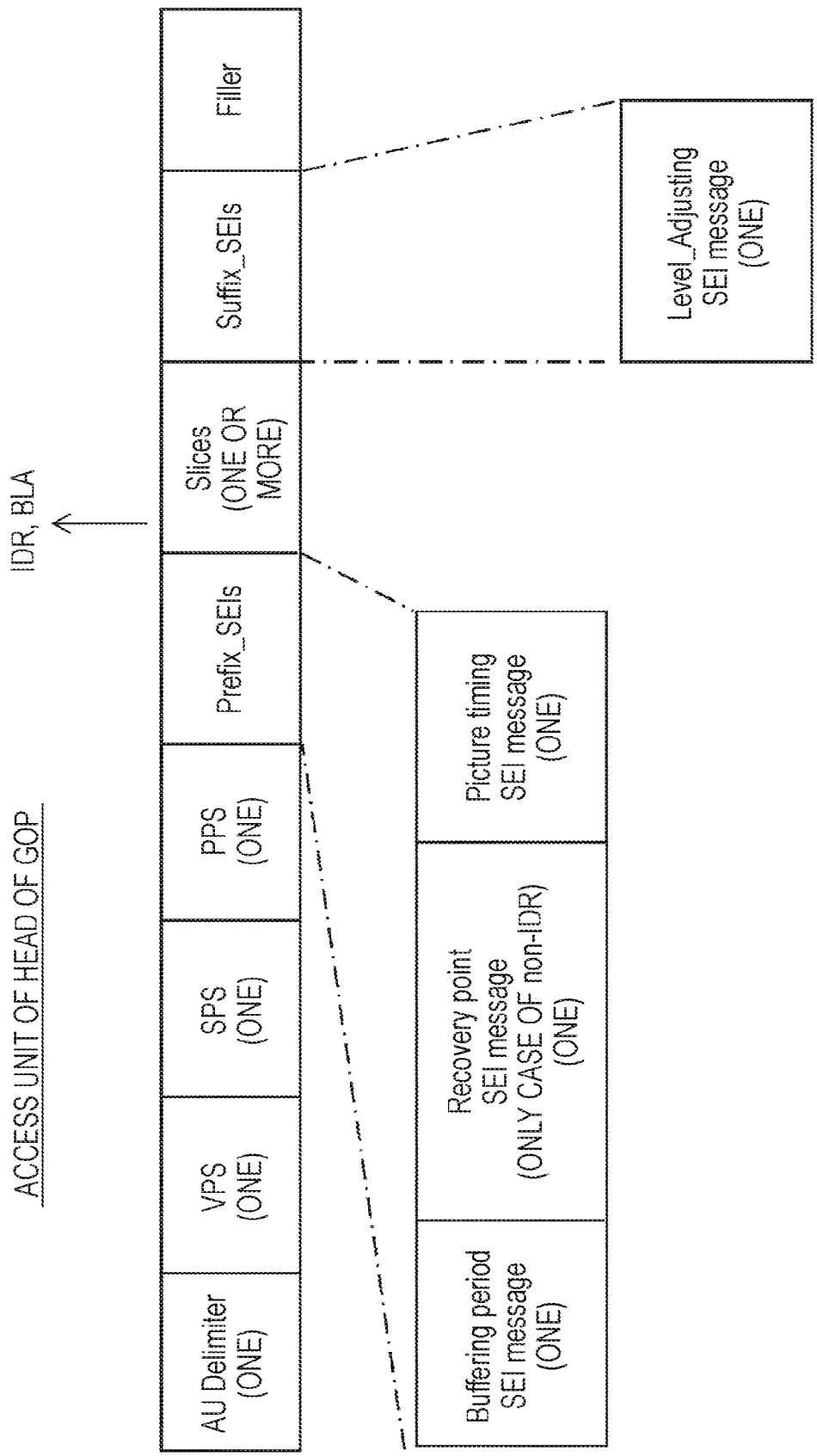
FIG. 10 is a diagram illustrating a head access unit of GOP in a case where an encoding method is HEVC.

FIG. 10 illustrates a head access unit of a group of pictures (GOP) in the case where the encoding method is HEVC. In the case of the HEVC encoding method, an SEI message group "Prefix_SEIs" for decoding is arranged before slices where pixel data has been encoded, and an SEI message group "Suffix_SEIs" for display is arranged after the slices. The level adjusting/SEI message is arranged as the SEI message group "Suffix_SEIs".

FIG. 11(a) illustrates a structure example (syntax) of the "Level Adjusting SEI message". "uuid_iso_iec_11578" has a UUID value indicated by "ISG/IEC 11578:1996 AnnexA.". "Level_Adjusting_SEI( )" is inserted into a field of "user_data_payload_byte". FIG. 11(b) illustrates a structure example (syntax) of "Level_Adjusting_SEI( )", and "Level_Adjusting_information_data( )" as the level adjustment characteristic information is inserted into "Level_Adjusting_SEI( )". "userdata_id" is an identifier of the level adjustment characteristic information indicated in 16 bits without code. An 8-bit field of "Level_Adjusting_SEI length" indicates a byte size of "Level_Adjusting_information_data( )" on and after the field.

FIG. 12 illustrates a structure example (syntax) of "Level_Adjusting_information_data( )". FIG. 13 illustrates content (semantics) of information in the structure example illustrated in FIG. 12. An 8-bit field of "peak_brightness_level" indicates a level of brightness of a current peak. In this case, the level of the brightness of the peak becomes peak_brightness_level*100 (cd/m**2).

An 8-bit field of "Contrast_ratio" indicates a dynamic range from 0 to peak_brightness_level. In this case, brightness of a black level becomes peak_brightness_level*(1/(black level*100)). "1" indicates a level of 1/100 of peak_brightness_level indicates a level of 1/400 of peak_brightness_level. "16" indicates a level of 1/1600 of peak_brightness_level. "64" indicates a level of 1/6400 of peak_brightness_level. Further, "128" indicates a level of 1/12800 of peak_brightness_level.

A 4-bit field of "coded_bit_extension_minus1" indicates expansion of a bit width per component of a pixel to be transmitted. "0" indicates 1-bit expansion (8 bits+1 bit=9 bits). "1" indicates 2-bit expansion (8 bits+2 bits=10 bits). "2" indicates 3-bit expansion (8 bits+3 bits=11 bits). "3" indicates 4-bit expansion (8 bits+4 bits=12 bits). A 16-bit field of "level_adjust [i]" indicates a correction value of an input i by a value with a code.

Further, as described above, the layer information for identifying the layer of the encoded image data of the picture of each of the hierarchies into the layer of the container (transport stream). In this embodiment, for example, a layer hierarchy descriptor (Layer_hierarchy descriptor) that is a descriptor including the layer information is inserted under a program map table (PMT).

FIG. 14 illustrates a structure example (syntax) of the layer hierarchy descriptor. FIG. 15 illustrates content (semantics) of information in the structure example illustrated in FIG. 14. An 8-bit field of "Layer_hierarchy_tag" indicates a descriptor type, and here indicates that the descriptor type is the layer hierarchy descriptor. An 8-bit field of "Layer_hierarchy_length" indicates the length (size) of the descriptor, and indicates the number of subsequent bytes, as the length of the descriptor.

A 3-bit field of "Layer_id_for_full_decoding" indicates a maximum temporal ID (temporal_id) in a case of fully decoding a corresponding video stream. A 3-bit field of "Layer_id_for_base_decoding" indicates a maximum temporal ID (temporal_id) in a case of decoding the base layer (first layer) portion of the corresponding video stream. A 1-bit field of "NAL_layer_signaling" indicates that layer signaling with nuh_layer_id is performed for the NAL unit header.

Figure 16:
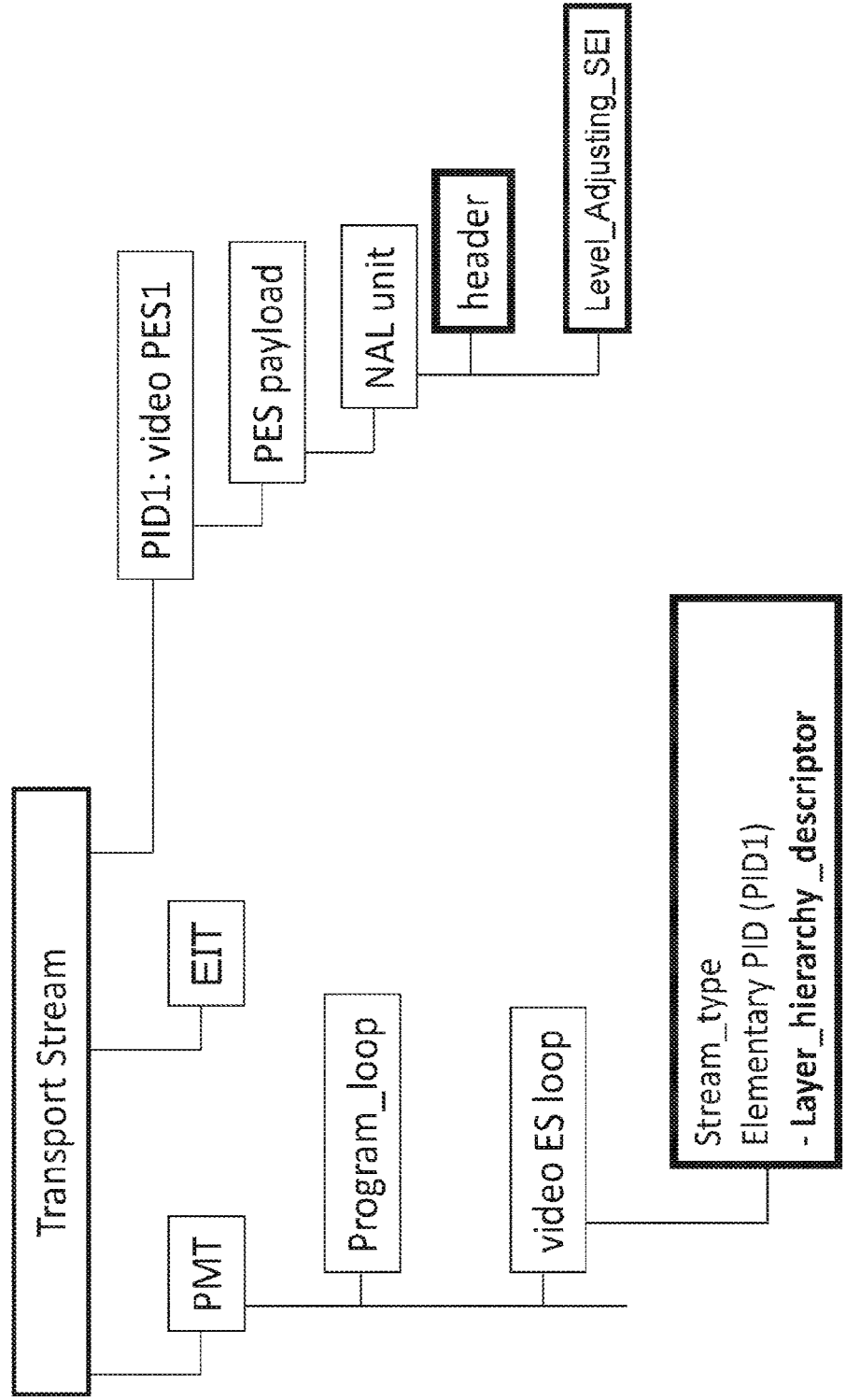
FIG. 16 is a diagram illustrating a configuration example of a transport stream.

FIG. 16 illustrates a configuration example of the transport stream TS. The transport stream TS includes a PES packet "PID1: video PES1" of the video elementary stream. The above-described level adjusting/SET message (Level_Adjusting SEI message) is inserted into the video elementary stream. Further, "nuh_temporal_id_plus1"), which means a hierarchy identifier (temporal_id), is arranged, and the layer identifier (Layer_id) is arranged as the layer information, in the header portion of the NAL unit.

Further, the transport stream TS includes the program map table (PMT) as program specific information (PSI). The PSI is information that describes which program each elementary stream included in the transport stream belongs to. Further, the transport stream TS includes an event information table (EIT) as serviced information (SI) that performs management in an event (program) unit.

In the PMT, an elementary loop having information related to each elementary stream exists. In this configuration example, a video elementary loop (Video ES loop) exists. In this video elementary loop, information such as a stream type and a packet identifier (PID) is arranged corresponding to the video elementary stream, and a descriptor that describes information related to the video elementary stream is also arranged. The above-described layer hierarchy descriptor (Layer_hierarchy descriptor) is arranged under the video elementary loop (Video ES loop) of the PMT.

(Configuration of Reception Device)

Figure 17:
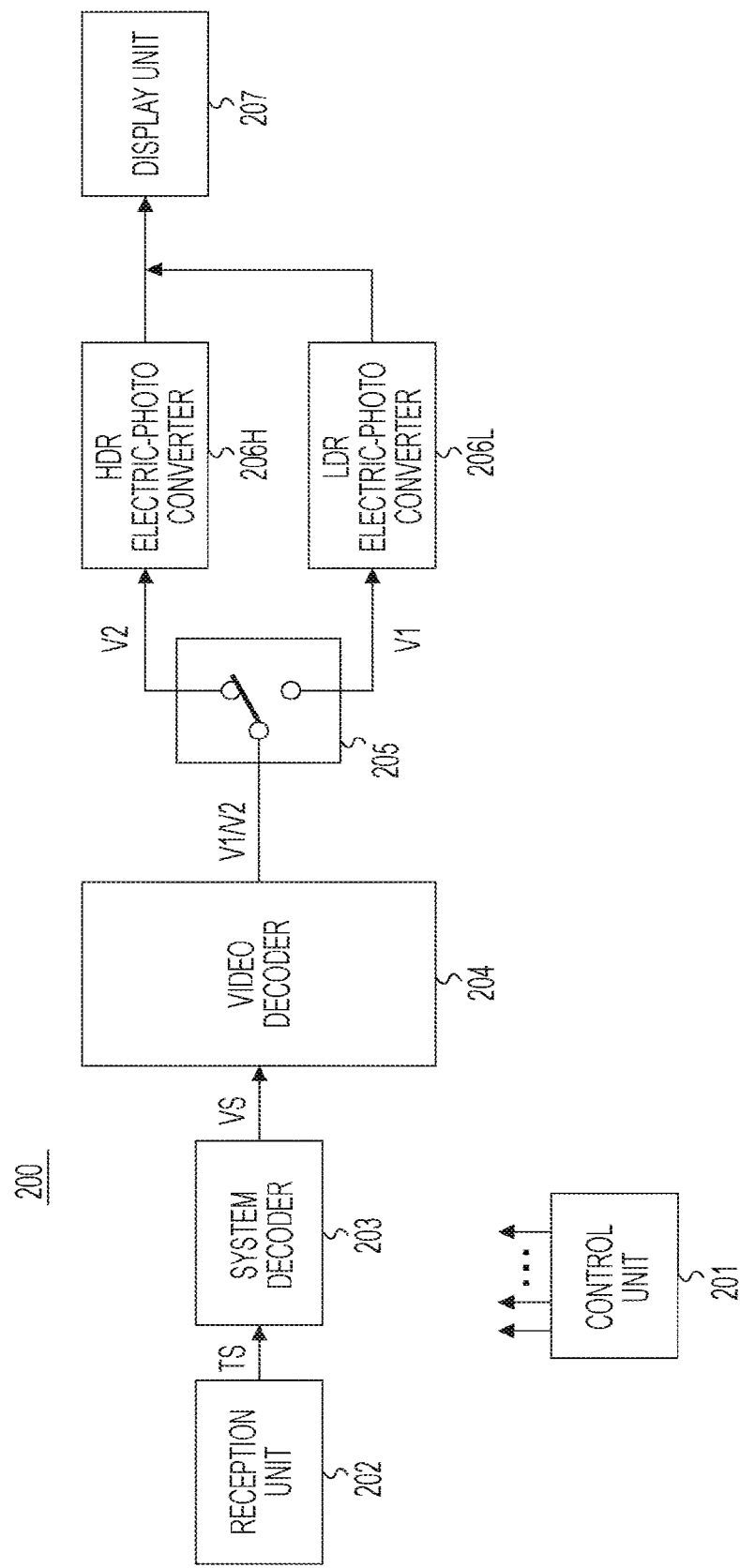
FIG. 17 is a block diagram illustrating a configuration example of a reception device that configures the transmission/reception system.

FIG. 17 illustrates a configuration example of the reception device 200. The reception device 200 includes a control unit 201, a reception unit 202, a system decoder 203, a video decoder 204, a switching unit 205, an LDR electric-photo converter 206L, an HDR electric-photo converter 206H, and a display unit (display device) 207. The control unit 201 includes a central processing unit (CPU), and controls operations of the respective units of the reception device 200 based on a control program stored in a storage (not illustrated).

The reception unit 202 receives the transport stream TS sent from the transmission device 100 through a broadcast wave or a packet of a network. The system decoder 203 extracts the video stream (elementary stream) VS from the transport stream TS. Further, the system decoder 203 extracts various types of information inserted into the layer of the container (transport stream), and sends the information to the control unit 201. This information includes the above-described layer hierarchy descriptor.

The video decoder 204 performs decoding processing and the like for the video stream VS extracted in the system decoder 203, and selectively outputs the first transmission video data V1 or the second transmission video data V2 according to display capability of the display unit 207. That is, in a case where the display unit 207 has display capability of the LDR image, the video decoder 204 outputs the first transmission image data V1. Meanwhile, in a case where the display unit 207 has display capability of the HDR image, the video decoder 204 outputs the second transmission image data V2.

Further, the video decoder 204 extracts an SEI message inserted in the video stream VS, and sends the SEI message to the control unit 201. This SEI message includes the level adjusting/SEI message having the level adjustment characteristic information.

Figure 18:
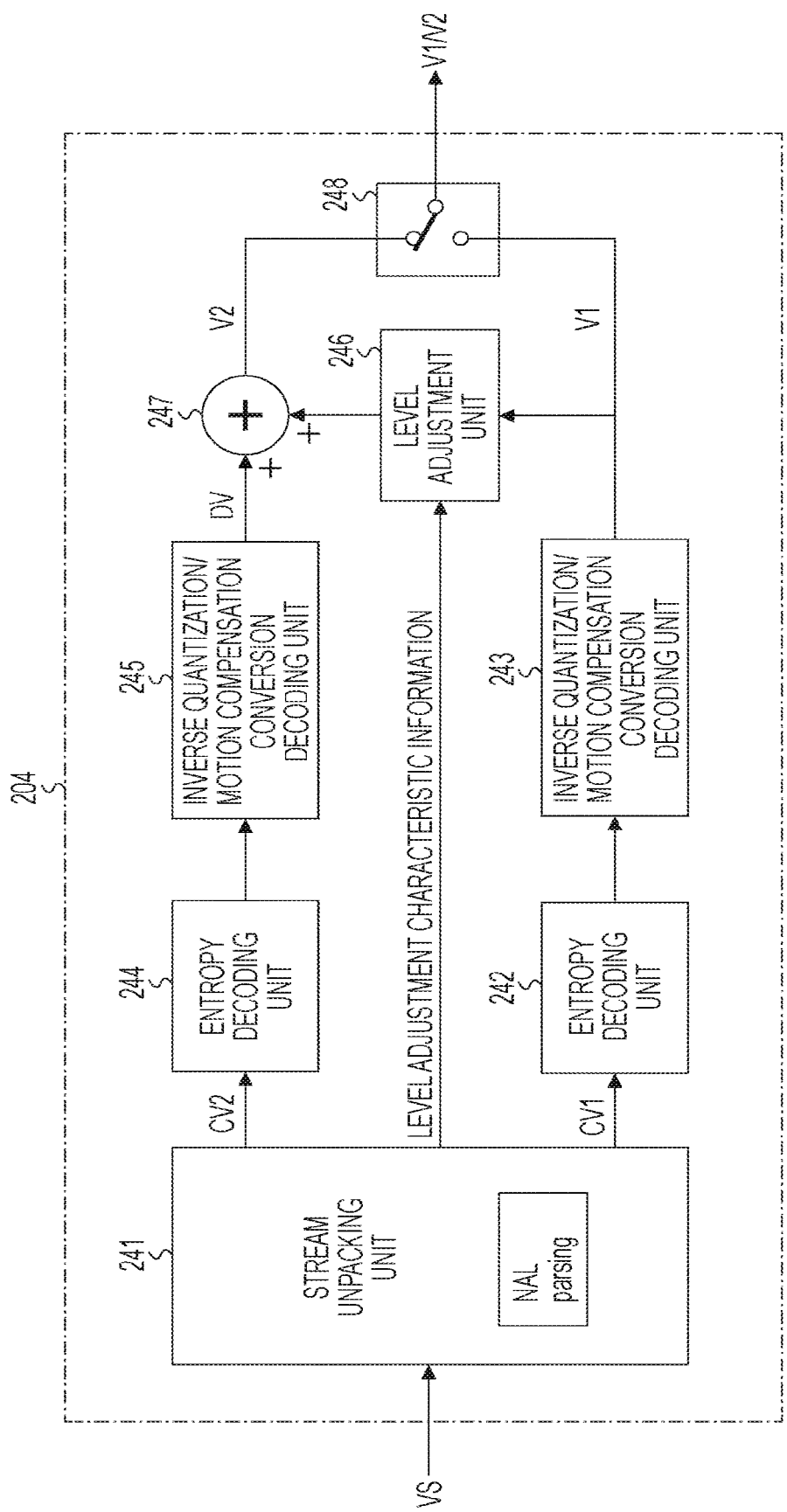
FIG. 18 is a block diagram illustrating a configuration example of a video decoder.

FIG. 18 illustrates a configuration of the video decoder 204. The video decoder 204 includes a stream unpacking unit 241, an entropy decoding unit 242, an inverse quantization/motion compensation decoding unit 243, an entropy decoding unit 244, an inverse quantization/motion compensation decoding unit 245, a level adjustment unit 246, an addition unit 247, and a switching unit 248.

The stream unpacking unit 241 classifies and takes out the first layer encoded image data CV1 and the second layer encoded image data CV2 from the video stream VS. In this case, the stream unpacking unit 241 classifies the first layer encoded image data CV1 and the second layer encoded image data CV2 based on the layer information of the encoded image data of the picture of each of the layers, the layer information being inserted in the layer of the video stream or the layer of the container. When a receiver performs LDR, display, the stream unpacking unit 241 sends only the CV1 to the entropy decoding unit 242. Meanwhile, when the receiver performs HDR display, the stream unpacking unit 241 sends the CV1 to the entropy decoding unit 242, and sends the CV2 to the entropy decoding unit 244.

In this case, the stream unpacking unit 241 selects the "method A" or the "method B" based on the 1-bit field of "NAL_layer_signaling" of the layer hierarchy descriptor (see FIG. 14), and classifies the first layer encoded image data CV1 and the second layer encoded image data CV2.

For example, when the 1-bit field of "NAL_layer_signaling" is "1" and indicates that the layer signaling with nuh_layer_id is performed for the NAL unit header, the stream unpacking unit 241 employs the "method A". At this time, "nuh_layer_id" and "nuh_temporal_id_plus1" acquired in an analysis (parsing) of the NAL unit become a state illustrated at the "method A" side of FIG. 19.

That is, in the pictures of the first layer (base layer) where "nuh_temporal_id_plus1" is 0, 1, and 2, "nuh_layer_id" becomes 1, 1, and 1. Meanwhile, in the pictures of the second layer (enhanced layer) where "nuh_temporal_id_plus1" is 3, 4, and 5, "nuh_layer_id" becomes 2, 2, and 2. Therefore, in this "method A", the first layer encoded image data CV1 and the second layer encoded image data CV2 are classified with the values of "nuh_layer_id".

Meanwhile, when the 1-bit field of "NAL_layer_signaling" is "0" and indicates that the layer signaling with nuh_layer_id is not performed for the NAL unit header, the stream unpacking unit 241 employs the "method B". At this time, "nuh_layer_id" and "nuh_temporal_id_plus1" acquired in an analysis (parsing) of the NAL unit become a state illustrated at the "method B" side of FIG. 19.

That is, in the pictures of the first layer (base layer) where "nuh_temporal_id_plus1" is 0, 1, and 2, "nuh_layer_id" becomes 0, 0, and 0. Meanwhile, in the pictures of the second layer (base layer) where "nuh_temporal_id_plus1" is 3, 4, and 5, "nuh_layer_id" becomes 0, 0, and 0. Therefore, the first layer encoded image data CV1 and the second layer encoded image data CV2 cannot be classified with the values of "nuh_layer_id".

However, in the layer hierarchy descriptor, "Layer_id_for_full_decoding" and "Layer_id_for_base_decoding" exist. As described above, the 3-bit field of "Layer_id_for_full_decoding" indicates a maximum temporal ID (temporal_id) in a case of fully decoding the corresponding video stream. Further, the 3-bit field of "Layer_id_for_base_decoding" indicates a maximum temporal ID (temporal_id) in a case of decoding the base layer (first layer) portion of the corresponding video stream. Therefore, in this "method B", the first layer encoded image data CV1 and the second layer encoded image data CV2 are classified with the values of "Layer_id_for_full_decoding" and "Layer_id_for_base_decoding" and a value of "nuh_temporal_id_plus1".

Further, referring back to FIG. 18, the stream unpacking unit 241 extracts the SEI message inserted in the video stream VS, and sends the SEI message to the control unit 201. This SEI message includes the level adjusting/SEI message having the level adjustment characteristic information.

The entropy decoding unit 242 performs entropy decoding for the first layer encoded image data CV1 taken in the stream unpacking unit 241 to obtain the quantized data. The inverse quantization/motion compensation conversion decoding unit 243 applies inverse quantization to the quantized data, and further performs motion compensation conversion decoding from the frequency axis data into the time axis data to obtain the first transmission image data V1.

The entropy decoding unit 244 performs entropy decoding for the second layer encoded image data CV2 taken in the stream unpacking unit 241 to obtain quantized data. The inverse quantization/motion compensation conversion decoding unit 245 applies inverse quantization to the quantized data, and further performs motion compensation conversion decoding from the frequency axis data into the time axis data to obtain the difference image data DV.

The level adjustment unit 246 applies the level adjustment to the first transmission image data V1. In this case, the level adjustment unit 246 applies correction using a mapping curve (level adjustment curve) similar to that in the level adjustment unit 143 of the video encoder 104 of the transmission device 100, based on the level adjustment characteristic information included in the level adjusting/SEI message extracted in the stream unpacking unit 241.

The addition unit 247 adds the first transmission image data V1 subjected to the level adjustment in the level adjustment unit 246 to the difference image data DV to obtain the second transmission image data V2. Note that, at the time of addition, prediction/compensation using a prediction vector between layers is performed. The switching unit 248 selectively outputs the first transmission image data V1 or the second transmission image data V2 according to display capability of the display unit (display device) 207 under control of the control unit 201. That is, when the display unit 207 has the display capability of the LDR image, the switching unit 248 outputs the first transmission image data V1. Meanwhile, when the display unit 207 has the display capability of the HDR image, the switching unit 248 outputs the second transmission image data V2.

Referring back to FIG. 17, the switching unit 205 selectively sends output image data of the video decoder 204 to the LDR electric-photo converter 206L or the HDR electric-photo converter 206H. In this case, the switching unit 205 sends the first transmission image data V1 to the LDR, electric-photo converter 206L when the output image data of the video decoder 204 is the first transmission image data V1. Meanwhile, the switching unit 205 sends the second transmission image data V2 to the HDR electric-photo converter 206H when the output image data of the video decoder 204 is the second transmission image data V2.

The LDR, electric-photo converter 206L applies, to the first transmission image data V1, electric-photo conversion having a reverse characteristic to the photo-electric conversion characteristic in the LDR photo-electric converter 103L in the transmission device 100 to obtain output image data for displaying the LDR image. Further, the HDR electric-photo converter 206H applies, to the second transmission image data V2, electric-photo conversion having a reverse characteristic to the photo-electric conversion characteristic in the HDR photo-electric converter 103H in the transmission device 100 to obtain output image data for displaying the HDR image.

The display unit 207 is configured from, for example, a liquid crystal display (LCD), an organic electro-luminescence (EL) panel, and the like. When the display unit 207 has the display capability of the LDR image, the display unit 207 displays the LDR image by the output image data obtained in the LDR electric-photo converter 206L. Meanwhile, when the display unit 207 has the display capability of the HDR image, the display unit 207 displays the HDR image by the output image data obtained in the HDR electric-photo converter 206H. Note that this display unit 207 may be an external device connected to the reception device 200.

An operation of the reception device 200 illustrated in FIG. 17 will be briefly described. In the reception unit 202, the transport stream TS sent from the transmission device 100 through a broadcast wave or a packet of a network is received. This transport stream TS is supplied to the system decoder 203. In the system decoder 203, the video stream (elementary stream) VS is extracted from the transport stream TS. Further, in the system decoder 203, various types of information inserted in the layer of the container (transport stream) are extracted, and are sent to the control unit 201. These types of information include the above-described layer hierarchy descriptor.

The video stream VS extracted in the system decoder 203 is supplied to the video decoder 204. This video stream VS includes first layer encoded image data CV1, which is made by encoding the first transmission image data V1, and second layer encoded image data CV2, which is made by encoding the difference image data DV obtained by subtracting the first transmission image data V1 from the second transmission image data V2.

In the video decoder 204, the first layer encoded image data CV1 and the second layer encoded image data CV2 are divided and taken out from the video stream VS based on the layer information of the encoded image data of the picture of each of the layers, which is inserted into the layer of the video stream or the layer of the container.

Then, in the video decoder 204, the first layer encoded image data CV1 is decoded, and the first transmission video data V1 is obtained. Further, in the video decoder 204, the second layer encoded image data CV2 is decoded and the first transmission image data V1 is added to the obtained difference image data DV, and the second transmission image data V2 is obtained. Here, the level adjustment is applied to the first transmission image data V1 to be added to the difference image data DV, based on the level adjustment characteristic information included in the level adjusting/SEI message.

When the output image data of the video decoder 204 is the first transmission image data V1, this first transmission image data V1 is supplied to the LDR electric-photo converter 206L through the switching unit 205. In this LDR electric-photo converter 206L, electric-photo conversion having a reverse characteristic to the photo-electric conversion in the transmission device 100 is applied to the first transmission image data V1, and the output image data for displaying the LDR image is obtained. This output image data is sent to the display unit 207, and the LDR image is displayed in the display unit 207.

Meanwhile, when the output image data of the video decoder 204 is the second transmission image data V2, this second transmission image data V2 is supplied to the HDR electric-photo converter 206H through the switching unit 205. In this HDR electric-photo converter 206H, photo-electric conversion having a reverse characteristic to the photo-electric conversion in the transmission device 100 is applied to the second transmission image data V2, and the output image data for displaying the HDR image is obtained. This output image data is sent to the display unit 207, and the HDR image is displayed in the display unit 207.

As described above, in the transmission/reception system 10 illustrated in FIG. 1, the first transmission video data obtained by applying the photo-electric conversion to the LDR image data and the second transmission video data obtained by applying the photo-electric conversion to the HDR imaue data are divided into layers and encoded, and the container including the video stream having encoded image data of pictures of the layers is transmitted. Therefore, both of the HDR image data and the LDR image data can be favorably transmitted.

Further, in the transmission/reception system 10 illustrated in FIG. 1, the first transmission image data is subtracted from the second transmission video data and the difference image data is obtained, the first transmission image data is encoded and the first layer encoded image data is obtained, and the difference image data is encoded and the second layer encoded image data is obtained. Therefore, the encoding efficiency can be improved.

Further, in the transmission/reception system 10 illustrated in FIG. 1, the encoded picture type of each of the pictures of the first transmission image data and the encoded picture type of each of the pictures corresponding to the difference image data accord with each other. Therefore, at the reception side, decoding of each of the pictures of the first layer encoded image data and the decoding of each of the corresponding pictures of the second layer encoded image data can be performed at the same timing, and a decode delay for obtaining the second transmission image data can be suppressed to be small.

Further, in the transmission/reception system 10 illustrated in FIG. 1, the layer information of the encoded image data of the picture of each of the layers is inserted into the layer of the video stream or the layer of the container and transmitted. Therefore, at the reception side, the encoded image data of the picture of each of the layers can be easily taken out from the video stream.

Further, in the transmission/reception system 10 illustrated in FIG. 1, when the difference image data is obtained, the level adjustment is applied to the first transmission image data and is caused to approach the second transmission image data. Therefore, the value of the difference image data can be made small, and the encoding efficiency can be further enhanced.

Further, in the transmission/reception system 10 illustrated in FIG. 1, the characteristic information of the level adjustment is inserted into the layer of the video stream and is transmitted. Therefore, at the reception side, after the level adjustment of the first transmission image data is performed based on the characteristic information of the level adjustment, the first transmission image data is added to the difference image data, so that the second transmission image data can be favorably obtained.

2. Modification

Note that, in the above-described embodiment, an example of obtaining the second layer encoded image data CV2 by encoding the difference image data DV obtained by subtracting the first transmission image data V1 subjected to the level adjustment from the second transmission image data V2 has been exemplarily described. However, (1) obtaining second layer encoded image data CV2 by encoding difference image data DV obtained by subtracting first transmission image data V1 from second transmission image data V2 subjected to level adjustment can be considered. Further, (2) obtaining the second layer encoded image data CV2 by encoding the second transmission image data V2 itself can be considered.

Figure 20:
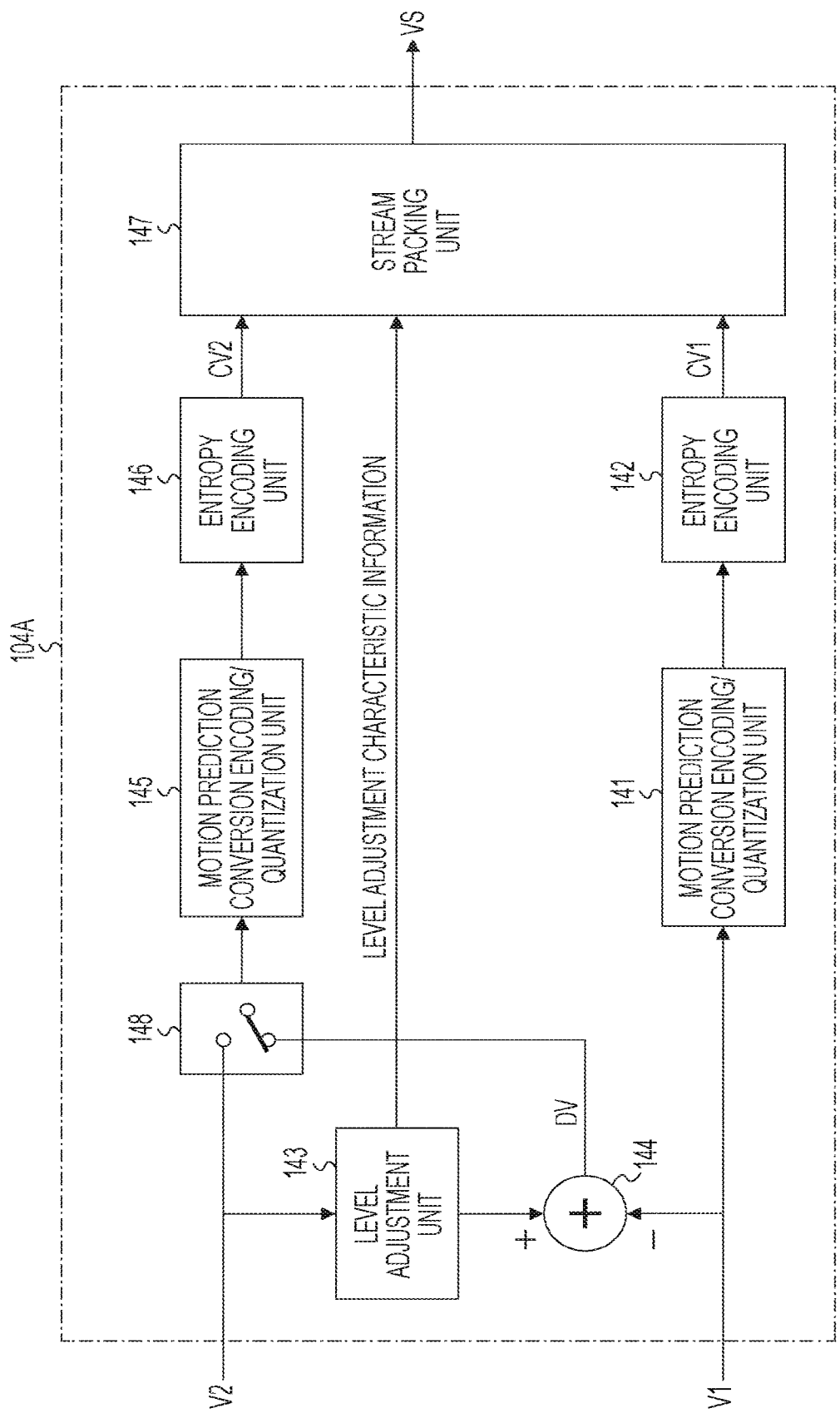
FIG. 20 is a block diagram illustrating another configuration example of the video encoder.

FIG. 20 illustrates a configuration example of a video encoder 104A corresponding to the above (1) and (2). In FIG. 20, a portion corresponding to FIG. 7 is denoted with the same reference sign, and detailed description thereof is appropriately omitted. A level adjustment unit 143 applies level adjustment to the second transmission image data V2 to cause a value of the second transmission image data V2 to approach a value of the first transmission image data V1. A subtraction unit 144 subtracts the first transmission image data V1 from the second transmission image data V2 subjected to the level adjustment to obtain the difference image data DV. Note that, at the time of subtraction, prediction/compensation using a prediction vector between layers is performed.

A switching unit 148 selectively sends the second image data V2 or the difference image data DV to a motion prediction conversion encoding/quantization unit 145. Here, when the difference image data DV is selected, the second layer encoded image data CV2 is data that is obtained by encoding the difference image data DV obtained by subtracting the first transmission image data V1 from the second transmission image data V2 subjected to the level adjustment. Meanwhile, when the second image data V2 is selected, the second layer encoded image data CV2 is data obtained by encoding the second transmission image data V2 itself.

Figure 21:
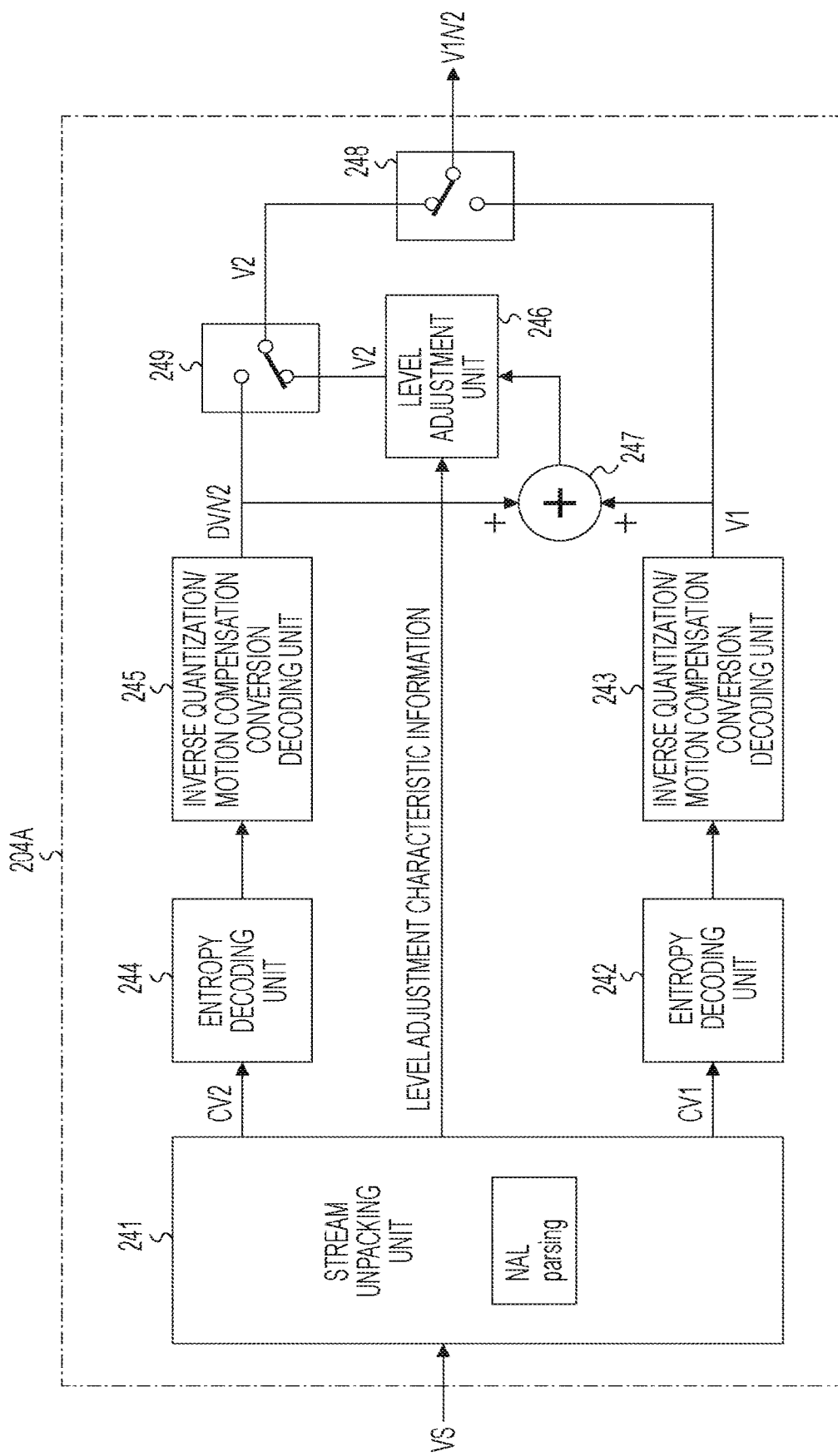
FIG. 21 is a block diagram illustrating another configuration example of the video decoder.

FIG. 21 illustrates a configuration example of a video decoder 204A corresponding to the video encoder 104A of FIG. 20. In FIG. 21, a portion corresponding to FIG. 18 is denoted with the same reference sign, and detailed description thereof is appropriately omitted. An inverse quantization/motion compensation conversion decoding unit 245 outputs the difference image data DV when the second layer encoded image data CV2 sent from a transmission side is encoded difference image data DV.

In this case, an addition unit 247 adds the difference image data DV and the first transmission image data V1. Note that, at the time of addition, prediction/compensation using a prediction vector between layers is performed. Then, a level adjustment unit 246 applies, to the added data, reverse level adjustment to the level adjustment unit 143 in the video encoder 204A to obtain the second transmission image data V2. Then, in this case, a switching unit 249 performs switching to output the second transmission image data V2 obtained from the level adjustment unit 246.

Meanwhile, the inverse quantization/motion compensation conversion decoding unit 245 outputs the second transmission image data V2 when the second layer encoded image data CV2 transmitted from the transmission side is encoded second transmission image data V2. Then, in this case, the switching unit 249 performs switching to output the second transmission image data V2.

Further, in the above-described embodiment, an example of causing the encoded picture type of each of the pictures of the first transmission image data V1 and the encoded picture type of each of the corresponding pictures of the difference image data DV to accord with each other has been described (see FIG. 5). However, the present technology can be applied to a case of not causing encoded picture types to accord with each other.

Figure 22:
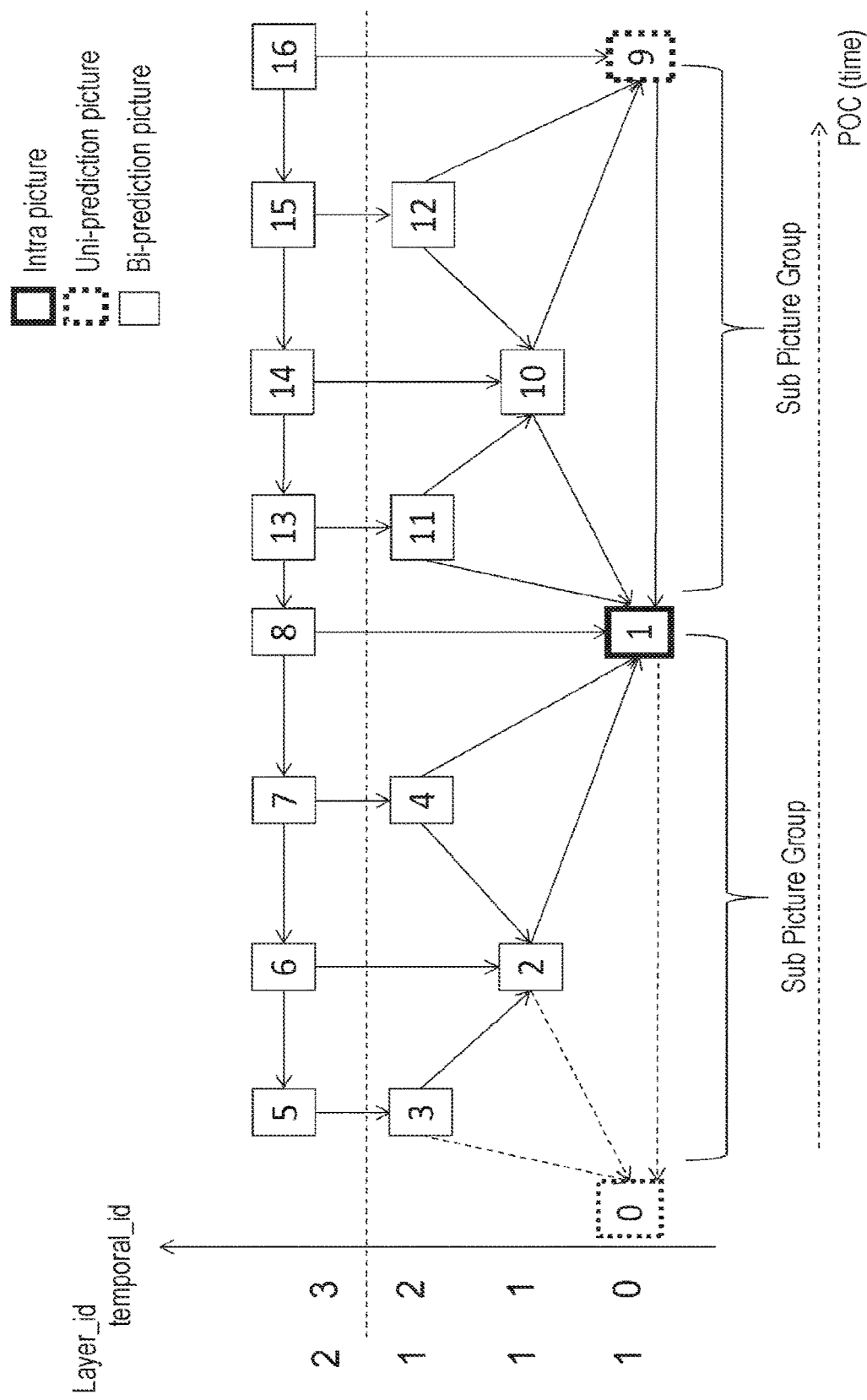
FIG. 22 is a diagram illustrating another example of hierarchical encoding performed in the video encoder of the transmission device.

FIG. 22 illustrates an example of hierarchical encoding in that case. In this example, pictures of data are classified into four hierarchies from 0 to 3, and image data of the picture of each of the hierarchies is encoded. The vertical axis represents the hierarchy. The pictures of the first transmission image data V1 configure lower hierarchies from a hierarchy 0 to a hierarchy 2, and the pictures of the difference image data DV configures a higher hierarchy of a hierarchy 3.

As temporal_ids (hierarchical identification information) to be arranged in a header portion of a NAL unit (nal_unit) that configures the encoded image data of the pictures of the hierarchies 0 to 3, 0 to 3 are respectively set. The horizontal axis represents a display order (POC: picture order of composition), and the left side indicates earlier in a display time and the right side indicates later in the display time. The rectangular frames illustrate pictures, and the numbers indicate the order of encoded pictures, that is, an encoding order (a decoding order at the reception side).

Further, in the above-described embodiment, an example in which one video stream VS having encoded image data of pictures of the first layer (base layer) and the second layer (enhanced layer) is included in the transport stream TS has been described. However, two video streams including a video stream having encoded image data of pictures of a first layer (base layer) and a video stream having encoded image data of pictures of a second layer (enhanced layer) may be included in a transport stream TS.

Further, the present technology can take configurations below.

(1) A transmission device includes:

an image encoding unit configured to divide first transmission image data and second transmission image data into layers and encode the layers, the first transmission image data being obtained by applying photo-electric conversion to first input image data having a contrast ratio of from 0 to 100% brightness of a white peak of a conventional LDR image, and the second transmission image data being obtained by applying photo-electric conversion to second input image data having a contrast ratio of from 0 to 100%*N (N is a number larger than 1), the contrast ratio exceeding the brightness of the conventional white peak, to generate a video stream having encoded image data of pictures of the layers; and a transmission unit configured to transmit a container in a predetermined format including the video stream.

(2) The transmission device according to (1), wherein the image encoding unit performs subtraction processing between the second transmission image data and the first transmission image data to obtain difference image data, and encodes the first transmission image data to obtain first layer encoded image data, and encodes the difference image data to obtain second layer encoded image data.

(3) The transmission device according to (2), wherein the image encoding unit applies level adjustment to the first transmission image data or the second transmission image data when performing the subtraction processing to obtain the difference image data.

(4) The transmission device according to (3), further includes:
an information insertion unit configured to insert characteristic information of the level adjustment and/or level information and contrast information of brightness to a layer of the video stream.
(5) The transmission device according to any of (2) to (4), wherein
the image encoding unit causes an encoded picture type of each of the pictures of the first transmission image data and an encoded picture type of each of the corresponding pictures of the difference image data to accord with each other.
(6) The transmission device according to (1), wherein
the image encoding unit encodes the first transmission image data to obtain first layer encoded image data, and encodes the second transmission image data to obtain second layer encoded image data.
(7) The transmission device according to any of (1) to (6), further includes:
a layer information insertion unit configured to insert layer information of the encoded image data of pictures of the layers to a layer of the video stream or a layer of the container.
(8) The transmission device according to (7), wherein
the layer information insertion unit inserts the layer information into a header of a NAL unit when inserting the layer information into the layer of the video stream.
(9) The transmission device according to (7), wherein
the layer information to be inserted into the layer of the container indicates a value of a temporal ID corresponding to each of the layers.
(10) A transmission method includes the steps of:
dividing first transmission image data and second transmission image data into layers and encoding the layers, the first transmission image data being obtained by applying photo-electric conversion to first input image data having a contrast ratio of from 0 to 100% to brightness of a white peak of a conventional LDR image, and the second transmission image data being obtained by applying photo-electric conversion to second input image data having a contrast ratio of from 0 to 100% N (N is a number larger than 1), the contrast ratio exceeding the brightness of the conventional white peak, to generate a video stream having encoded image data of pictures of the layers; and
transmitting, by a transmission unit, a container in a predetermined format including the video stream.
(11) A reception device includes:
a reception unit configured to receive a container including a video stream having encoded image data of pictures of layers, the video stream being made by dividing first transmission image data and second transmission image data into layers and encoding the layers,
the first transmission image data being obtained by applying photo-electric conversion to first input image data having a contrast ratio of from 0 to 100% to brightness of a white peak of a conventional LDR image, and
the second transmission image data being obtained by applying photo-electric conversion to second input image data having a contrast ratio of from 0 to 100%*N (N is a number larger than 1), the contrast ratio exceeding the brightness of the conventional white peak; and
a processing unit configured to process the video stream included in the container received in the reception unit.
(12) The reception device according to (11), wherein
the processing unit selectively outputs the first transmission image data or the second transmission image data.

(13) The reception device according to (12), wherein
the processing unit outputs the first transmission image data or the second transmission image data based on display capability information of a display unit.
(14) The reception device according to (12) or (13), further includes:
an electric-photo converter configured to apply corresponding electric-photo conversion to the first transmission image data or the second transmission image data output from the processing unit.
(15) The reception device according to any of (11) to (14), wherein
the video stream includes first layer encoded image data made by encoding the first transmission image data, and second layer encoded image data made by encoding difference image data obtained by performing subtraction processing between the second transmission image data and the first transmission image data, and
the processing unit
decodes the first layer encoded image data to obtain the first transmission video data, and
adds the first transmission image data to the difference image data obtained by decoding the second layer encoded image data to obtain the second transmission image data.
(16) The reception device according to (15), wherein
the processing unit applies level adjustment to the first transmission image data or added image data when obtaining the second transmission image data.
(17) The reception device according to (16), wherein
characteristic information of the level adjustment is inserted into a layer of the video stream, and
the processing unit applies the level adjustment to the first transmission image data or the added image data based on the characteristic information of the level adjustment.
(18) The reception device according to any of (15) to (17), wherein
layer information of the encoded image data of pictures of layers is inserted into a layer of the video stream or a layer of the container, and
the processing unit takes out the first layer encoded image data and the second layer encoded image data from the video stream based on the layer information.
(19) A reception method includes the steps of:
receiving, by a reception unit, a container including a video stream having encoded image data of layers, the video stream being obtained by dividing first transmission image data and second transmission image data into layers, and encoding the layers,
the first transmission image data being obtained by applying photo-electric conversion to first input image data having a contrast ratio of from 0 to 100% to brightness of a white peak of a conventional LDR image, and
the second transmission image data being obtained by applying photo-electric conversion to second input image data having a contrast ratio of from 0 to 100%*N (N is a number larger than 1), the contrast ratio exceeding the brightness of the conventional white peak; and
processing the video stream included in the container received in the receiving step.

A principal characteristic of the present technology is to enable favorable transmission of both of the HDR image data and the LDR image data, by dividing the first transmission image data, which is obtained by applying the photo-electric conversion to the LDR image data, and the second transmission image data, which is obtained by applying the photo-electric conversion to the HDR image data, into layers and encoding the layers, and transmitting the container including the video stream having encoded image data of pictures of the layers (see FIG. 5).

REFERENCE SIGNS LIST

10 Transmission/reception system
100 Transmission device
101 Control unit
102L LDR camera
102H HDR camera
103L LDR photo-electric converter
103H HDR photo-electric converter
104, 104A Video encoder
105 System encoder
106 Transmission unit
141 Motion prediction conversion encoding/quantization unit
142 Entropy encoding unit
143 Level adjustment unit
144 Subtraction unit
145 Motion prediction conversion encoding/quantization unit
146 Entropy encoding unit
147 Stream packing unit
148 Switching unit
200 Reception device
201 Control unit
202 Reception unit
203 System decoder
204, 204A Video decoder
205 Switching unit
206L LDR, electric-photo converter
206H HDR electric-photo converter
207 Display unit
241 Stream unpacking unit
242 Entropy decoding unit
243 Inverse quantization/motion compensation conversion decoding unit
244 Entropy decoding unit
245 Inverse quantization/motion compensation conversion decoding unit
246 Level adjustment unit
247 Addition unit
248, 249 Switching unit

The invention claimed is:

1. A transmission device, comprising:
processing circuitry configured to
generate a first video stream having encoded image data of pictures of first transmission image data and a second video stream having encoded image data of difference image data obtained by performing subtraction processing between second transmission image data and the first transmission image data, the first transmission image data being obtained by applying photo-electric conversion to first input image data having a first dynamic range, and the second transmission image data being obtained by applying photo-electric conversion to second input image data having a second dynamic range; and
transmit a container in a predetermined format including the first video stream and the second video stream,
wherein the processing circuitry is configured to apply a level adjustment to the first transmission image data or the second transmission image data when performing the subtraction processing to obtain the difference image data, and
wherein the level adjustment adjusts the level of the first transmission image data based on a level adjustment curve.

2. The transmission device according to claim 1, wherein a contrast ratio of the second dynamic range exceeds a contrast ratio of the first dynamic range.

3. The transmission device according to claim 1, wherein the processing circuitry is configured to insert characteristic information of the level adjustment and/or level information and contrast information of brightness to a layer of the first video stream or a layer of the second video stream.

4. The transmission device according to claim 2, wherein the processing circuitry associates an encoded picture type of each of the pictures of the first transmission image data and an encoded picture type of each of corresponding pictures of the difference image data with each other.

5. The transmission device according to claim 1, wherein the processing circuitry is configured to insert layer information of the encoded image data of pictures of the layers to a layer of the first video stream, a layer of the second video stream or a layer of the container.

6. The transmission device according to claim 5, wherein the processing circuitry is configured to insert the layer information into a header of a NAL unit when inserting the layer information into the layer of the first video stream or the layer of the second video stream.

7. The transmission device according to claim 5, wherein the layer information to be inserted into the layer of the container indicates a value of a temporal ID corresponding to each of the layers.

8. A transmission method, comprising:
generating, by processing circuitry, a first video stream having encoded image data of pictures of first transmission image data and a second video stream having encoded image data of difference image data obtained by performing subtraction processing between second transmission image data and the first transmission image data, the first transmission image data being obtained by applying photo-electric conversion to first input image data having a first dynamic range, and the second transmission image data being obtained by applying photo-electric conversion to second input image data having a second dynamic range wherein the processing circuitry is configured to apply a level adjustment to the first transmission image data or the second transmission image data when performing the subtraction processing to obtain the difference image data, and wherein the level adjustment adjusts the level of the first transmission image data based on a level adjustment curve; and
transmitting a container in a predetermined format including the first video stream and the second video stream.

9. A reception device, comprising:
processing circuitry configured to
receive a container including a first video stream having encoded image data of pictures of first transmission image data and a second video stream having encoded image data of difference image data obtained by performing subtraction processing between second transmission image data and the first transmission image data, the first transmission image data being obtained by applying photo-electric conversion to first input image data having a first dynamic range, and the second transmission image data being obtained by applying photo-electric conversion to second input image data having a second dynamic range, wherein a level adjustment was applied to the first transmission image data or the second transmission image data when the subtraction processing was applied to obtain the difference image data, and wherein the level adjustment adjusts the level of the first transmission image data based on a level adjustment curve; and process the first video stream and the second video stream included in the container.

10. The reception device according to claim 9, wherein the processing circuitry is configured to decode the encoded image data included in the first video stream to obtain the first transmission video data, and add the first transmission image data to the difference image data obtained by decoding the encoded image data of the difference image data included in the second video stream to obtain the second transmission image data.

11. The reception device according to claim 10, wherein the processing circuitry is configured to apply added image data when obtaining the second transmission image data.

12. The reception device according to claim 11, wherein characteristic information of the level adjustment is inserted into a layer of the first video stream or a layer of the second video stream, and the processing circuitry is configured to apply the level adjustment to the first transmission image data or the added image data based on the characteristic information of the level adjustment.

13. The reception device according to claim 10, wherein the first video stream includes first layer encoded image data of the first transmission image data, and the second video stream includes second layer encoded image data of the difference image data, layer information of encoded image data of pictures of layers is inserted into a layer of the first video stream, a layer of the second video stream or a layer of the container, and the processing circuitry is configured to take out the first layer encoded image data and the second layer encoded image data from the container based on the layer information.

14. A reception method, comprising:

receiving, by processing circuitry, a container including a first video stream having encoded image data of pictures of first transmission image data and a second video stream having encoded image data of difference image data obtained by performing subtraction processing between second transmission image data and the first transmission image data, the first transmission image data being obtained by applying photo-electric conversion to first input image data having a first dynamic range, and the second transmission image data being obtained by applying photo-electric conversion to second input image data having a second dynamic range, wherein the processing circuitry is configured to apply a level adjustment to the first transmission image data or the second transmission image data when performing the subtraction processing to obtain the difference image data, and wherein the level adjustment adjusts the level of the first transmission image data based on a level adjustment curve; and processing, by the processing circuitry, the first video stream and the second video stream included in the container.

* * * * *